United States Patent
Jain et al.

(10) Patent No.: US 11,212,261 B2
(45) Date of Patent: *Dec. 28, 2021

(54) DATA COMPUTATION IN A MULTI-DOMAIN CLOUD ENVIRONMENT

(71) Applicant: Protegrity Corporation, Grand Cayman (KY)

(72) Inventors: Rajnish Jain, Fairfield, CT (US); Vichai Levy, Norwalk, CT (US); Ulf Mattsson, Cos Cob, CT (US); Yigal Rozenberg, Wilton, CT (US)

(73) Assignee: Protegrity Corporation, Grand Cayman (KY)

( * ) Notice: Subject to any disclaimer, the term of this patent is extended or adjusted under 35 U.S.C. 154(b) by 168 days.

This patent is subject to a terminal disclaimer.

(21) Appl. No.: 16/702,291

(22) Filed: Dec. 3, 2019

(65) Prior Publication Data
US 2020/0106749 A1   Apr. 2, 2020

Related U.S. Application Data

(63) Continuation of application No. 15/951,044, filed on Apr. 11, 2018, now Pat. No. 10,541,975, which is a
(Continued)

(51) Int. Cl.
*H04L 29/06* (2006.01)
*H04L 29/08* (2006.01)

(52) U.S. Cl.
CPC ...... *H04L 63/0281* (2013.01); *H04L 63/0435* (2013.01); *H04L 63/0471* (2013.01);
(Continued)

(58) Field of Classification Search
CPC ............ H04L 63/0281; H04L 63/0435; H04L 63/0471; H04L 63/08
See application file for complete search history.

(56) References Cited

U.S. PATENT DOCUMENTS

| 2003/0016680 A1* | 1/2003 | Stein | H04M 7/1215 370/401 |
| 2003/0095566 A1* | 5/2003 | Bunting | H04Q 3/0029 370/465 |

(Continued)

OTHER PUBLICATIONS

European Extended Search Report, European Patent Application No. 15852119.5, dated Feb. 21, 2018, 6 pages.
(Continued)

*Primary Examiner* — Jason Chiang
(74) *Attorney, Agent, or Firm* — Fenwick & West LLP

(57) ABSTRACT

A gateway device for implementing data security is described herein. The gateway device is coupled between a client device and a server device, and is configured to receive encoded data and a set of operations from the server device in response to a request for cloud services from the client device. The gateway device is configured to decode the encoded data, and to provide the decoded data and the set of operations to the client device. The client device is configured to perform the set of operations on the decoded data, and to incorporate the operation results into an application or interface corresponding to the requested cloud service. The gateway device is configured to encode the operation result data, and to provide the encoded operation result data to the server device for storage.

14 Claims, 14 Drawing Sheets

Related U.S. Application Data continuation of application No. 14/885,662, filed on Oct. 16, 2015, now Pat. No. 9,973,475.

(60) Provisional application No. 62/067,104, filed on Oct. 22, 2014.

(52) U.S. Cl.
CPC .............. *H04L 63/08* (2013.01); *H04L 67/34* (2013.01); *H04L 69/08* (2013.01); *H04L 63/1408* (2013.01); *H04L 67/16* (2013.01)

(56) References Cited

U.S. PATENT DOCUMENTS

| | | | | |
|---|---|---|---|---|
| 2004/0040030 | A1* | 2/2004 | Fenton | G06F 9/44536 719/320 |
| 2005/0002341 | A1* | 1/2005 | Lee | H04L 63/08 370/254 |
| 2006/0133420 | A1* | 6/2006 | Chung | H04L 65/1096 370/469 |
| 2011/0264906 | A1* | 10/2011 | Pourzandi | H04L 9/083 713/153 |
| 2012/0026870 | A1* | 2/2012 | Challa | H04L 41/046 370/230 |
| 2012/0278621 | A1 | 11/2012 | Woloszyn | |
| 2013/0219462 | A1* | 8/2013 | Aratsu | G06F 21/556 726/1 |
| 2013/0268357 | A1 | 10/2013 | Heath | |
| 2014/0019953 | A1* | 1/2014 | Kolesnikov | G06F 8/71 717/170 |
| 2014/0122866 | A1 | 5/2014 | Haeger et al. | |
| 2014/0177825 | A1 | 6/2014 | Mattsson et al. | |
| 2014/0195798 | A1* | 7/2014 | Brugger | G06F 21/60 713/154 |
| 2014/0281531 | A1 | 9/2014 | Phegade et al. | |
| 2014/0331062 | A1* | 11/2014 | Tewari | G06F 21/6245 713/189 |
| 2015/0188893 | A1* | 7/2015 | Sood | H04L 63/0435 713/153 |
| 2016/0315915 | A1* | 10/2016 | Byszio | H04L 63/166 |

OTHER PUBLICATIONS

Papagiannis, I. et al., "Cloud Filter: Practical Control of Sensitive Data Propagation to the Cloud," Proceedings of the 2012 ACM Workshop on Cloud Computing Security Workshop, ACM, Dec. 2012, pp. 97-102, [Online] [Retrieved Nov. 30, 2015] Retrieved from the Internet<URL:http://www.et.nnis.gr/publications/ccsw2012.pdf>.

PCT International Search Report and Written Opinion, PCT Application No. PCT/US15/56481, dated Jan. 12, 2016, 11 pages.

United States Office Action, U.S. Appl. No. 14/885,662, filed Sep. 28, 2017, 30 pages.

United States Office Action, U.S. Appl. No. 14/885,662, filed Jun. 22, 2017, 21 pages.

United States Office Action, U.S. Appl. No. 14/885,662, filed Mar. 21, 2017, 16 pages.

United States Office Action, U.S. Appl. No. 15/951,044, filed Jul. 25, 2019, 20 pages.

* cited by examiner

DATA COMPUTATION IN A MULTI-DOMAIN CLOUD ENVIRONMENT

RELATED APPLICATIONS

This application is a continuation of U.S. application Ser. No. 15/951,044, filed Apr. 11, 2018, now U.S. Pat. No. 10,541,975, which is a continuation of U.S. application Ser. No. 14/885,662, filed Oct. 16, 2015, now U.S. Pat. No. 9,973,475, which claims the benefit of U.S. Provisional Application No. 62/067,104, filed Oct. 22, 2014, both of which are incorporated by reference in their entirety.

FIELD OF ART

This application relates to the field of data protection, and more specifically to performing computations on protected data while maintaining data confidentiality.

BACKGROUND

Many websites, services, and applications implement various data protection techniques. For instance, an entity within a trusted domain may encrypt or tokenize data, and may provide the protected data to an entity outside of the trusted domain. Entities outside a trusted domain, such as cloud service providers, clients coupled to trusted network, applications running on a device outside of a device trusted domain, and the like can provide data services that require the performance of various data operations on unprotected data. However, providing the unprotected data to the entity outside of the trusted domain exposes the data to potential mis-use by the entity, interception by an unauthorized entity, or any number of other security threats.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure 1:
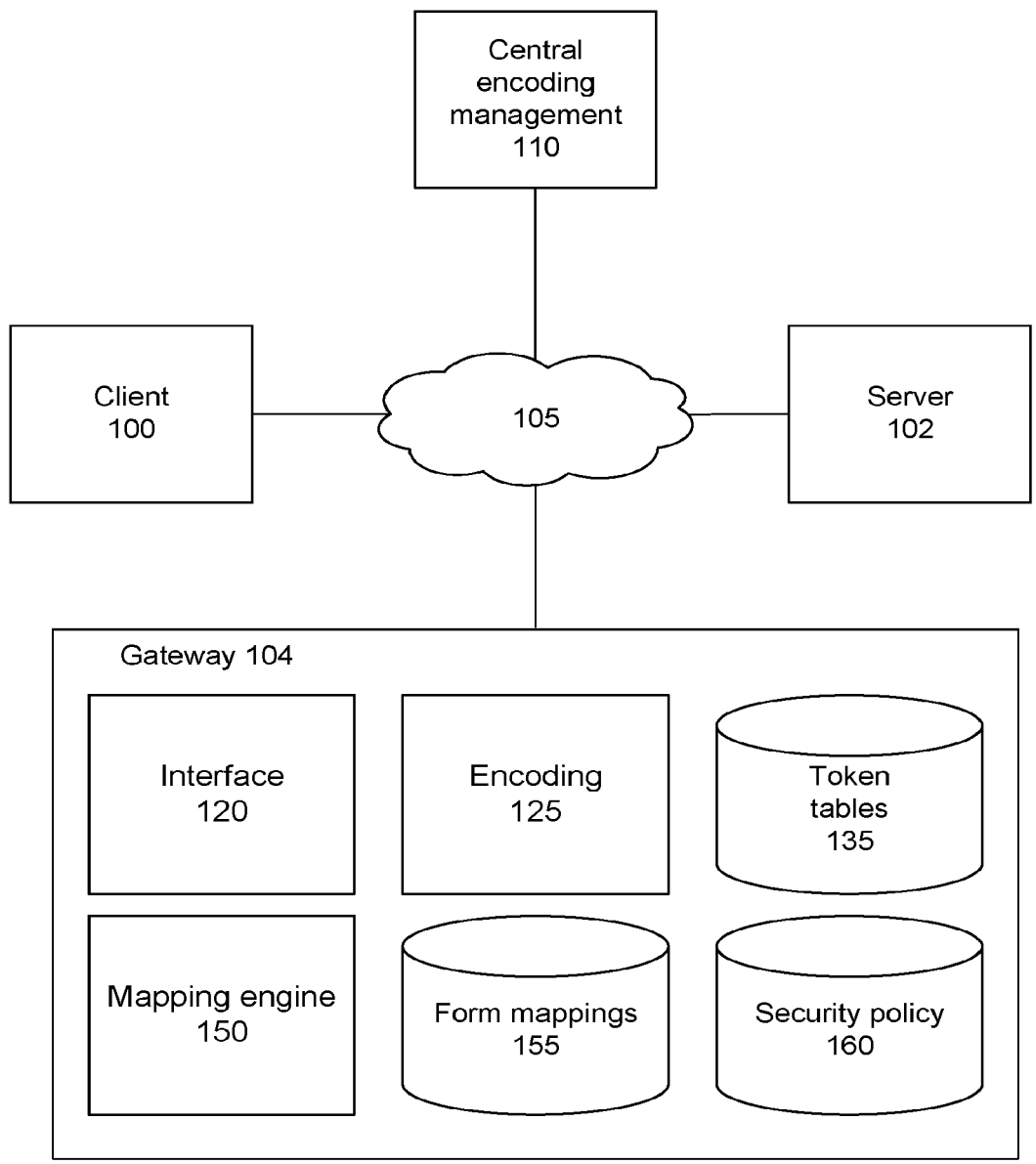
FIG. 1 is a system diagram for a gateway environment, according to one embodiment.

The figures (Figs.) depict embodiments for purposes of illustration only. One skilled in the art will readily recognize from the following description that alternative embodiments of the structures and methods illustrated herein can be employed without departing from the principles of the invention described herein.

DETAILED DESCRIPTION

Reference will now be made in detail to several embodiments, examples of which are illustrated in the accompanying figures. It is noted that wherever practicable, similar or like reference numbers can be used in the figures and can indicate similar or like functionality. The figures depict embodiments of the disclosed system (or method) for purposes of illustration only. One skilled in the art will readily recognize from the following description that alternative embodiments of the structures and methods illustrated herein can be employed without departing from the principles described herein.

Data Protection Overview

The transmission and storage of sensitive data, such as passwords, social security numbers, account numbers, driving license numbers, transaction information, date information, etc, can be challenging. Before sensitive data can be transmitted or stored, the sensitive data can be tokenized into tokenized data to prevent an unauthorized entity from accessing the data.

As used herein, the tokenization of data refers to the generation of tokenized data by querying one or more token tables mapping input values to tokens with one or more portions of the data, and replacing the queried portions of the data with the resulting tokens from the token tables. Tokenization can be combined with encryption for increased security, for example by encrypting sensitive data using a mathematically reversible cryptographic function (e.g., datatype-preserving encryption or DTP), a one-way non-reversible cryptographic function (e.g., a hash function with strong, secret salt), or a similar encryption before or after the tokenization of the sensitive data. Any suitable type of encryption can be used in the tokenization of data. A detailed explanation of the tokenization process can be found in U.S.

patent application Ser. No. 13/595,438, filed Aug. 27, 2012, which is hereby incorporated by reference.

As used herein, the term token refers to a string of characters mapped to an input string of characters in a token table, used as a substitute for the string of characters in the creation of tokenized data. A token can have the same number of characters as the string being replaced, or can have a different number of characters. Further, the token can have characters of the same type (such as numeric, symbolic, or alphanumeric characters) as the string of characters being replaced or characters of a different type.

Any type of tokenization can be used to perform the functionalities described herein. One such type of tokenization is static lookup table ("SLT") tokenization. SLT tokenization maps each possible input values (e.g., possible character combinations of a string of characters) to a particular token. An SLT includes a first column comprising permutations of input string values, and can include every possible input string value. The second column of an SLT includes tokens, with each associated with an input string value of the first column. Each token in the second column can be unique among the tokens in the second column. Optionally, the SLT can also include one or several additional columns with additional tokens mapped to the input string values of the first column.

In some embodiments, to increase the security of tokenization, sensitive data can be tokenized two or more times using the same or additional token tables. For example, the first 8 digits of a 16 digit credit card number can be tokenized with an 8 digit token table to form first tokenized data, and the last 12 digits of the first tokenized data can be tokenized using a 12 digit token table to form second tokenized data. In another example, the first 4 digits of a credit card number are tokenized using a first token table, the second 4 digits are tokenized with a second token table, the third 4 digits are tokenized with a third token table, and the last 4 digits are tokenized with a fourth token table. Certain sections of the sensitive data can also be left un-tokenized; thus a first subset of the resulting tokenized data can contain portions of the sensitive data and a second subset of the tokenized data can contain a tokenized version of the sensitive data.

Dynamic token lookup table ("DLT") tokenization operates similarly to SLT tokenization, but instead of using static tables for multiple tokenizations, a new token value is generated and included in a token table entry each time sensitive data is tokenized. The new token value can be generated randomly, can be randomly selected from among a set of values, or can be generated via any other suitable means. A seed value can be used to generate token values, to select a set of values from which to select a token value from among multiple sets of values, or to randomly select a value from among a set of values for use as the token value. It should be noted that as used herein, "randomly" can refer to pseudo-randomly or substantially randomly. The seed value can include a portion of data being tokenized.

In some embodiments, a DLT can map portions of sensitive data being replaced by a token to a token. The DLT can include the entire sensitive data (including portions of the sensitive data that are not replaced by a token), and the DLT can indicate the portion of the sensitive data being replaced by the token and can map the portion to the token. DLTs can in some configurations provide a higher level of security compared to SLT but require the storage and/or transmission of a large amount of data associated with each of the generated token tables. It should be noted that DLT tokenization can be used to tokenize data according to the principles described above with regards to SLT tokenization.

The security of tokenization can be further increased through the use of initialization vectors ("IVs"). An initialization vector is a string of data used to modify sensitive data prior to tokenizing the sensitive data. Example sensitive data modification operations include performing linear or modulus addition on the IV and the sensitive data, performing logical operations on the sensitive data with the IV, encrypting the sensitive data using the IV as an encryption key, and the like. The IV can be a portion of the sensitive data. For example, for a 12-digit number, the last 4 digits can be used as an IV to modify the first 8 digits before tokenization. IVs can also be retrieved from an IV table, received from an external entity configured to provide IVs for use in tokenization, or can be generated based on, for instance, the identity of a user, the date/time of a requested tokenization operation, based on various tokenization parameters, and the like. data modified by one or more IVs that is subsequently tokenized includes an extra layer of security—an unauthorized party that gains access to the token tables used to tokenized the modified data will be able to detokenize the tokenized data, but will be unable to de-modify the modified data without access to the IVs used to modify the data.

As used herein, the encoding of data can refer to any combination of one or more of: tokenization operations (static or dynamic), data modification operations (for instance, using one or more IVs, pre-processing operations, and the like), encryption operations, data obfuscation or masking operations, data hashing operations, and data anonymization operations.

Gateway Environment Overview

FIG. 1 is a system diagram for a gateway environment, according to one embodiment. The environment of FIG. 1 includes a plurality of client devices 100, at least one server 102, a gateway device 104, and a central encoding management system 110, communicatively coupled via a network 105. The client device 100 is a computing device configured to communicate via the network 105. In some embodiments, the client device 100 is associated with a user, a business, or other entity or organization. The server 102 is a computing device, such as a web server, a local area network ("LAN") server, or any other computer or computing device configured to communicate via the network 105. The server 102 can be associated with a user, a business, any other entity or organization. The gateway device 104 is a computing device configured to communicate via the network 105, and can be associated with a user, a security entity, the client device 100, the server 102, or any other suitable entity or organization. Although only a single gateway device 104 is included in the embodiment of FIG. 1, it should be emphasized that any number of communicatively coupled and/or associated gateway devices can be implemented within the environments described herein. Further, the term "gateway device" can refer to any number of associated computing devices configured to perform the functionality of the gateway device as described herein.

The client device 100 and the server 102 can communicate, exchange, and protect sensitive data via the network 105. Although the client device 100 and the server 102 are each coupled to the network 105 in the embodiment of FIG. 1, in various embodiments described herein, the client device 100 and the server 102 communicate through the gateway device 104 (e.g., communications from the client device 100 and the server 102 are received at the gateway device 104 and passed on the server 102 and the client device 100, respectively). As described below, the gateway device 104 is configured to generate a mapping between data fields generated by client device 100 (for instance, data fields generated as a result of a user entering certain information in a user interface displayed on the client device 100) and data received at the gateway device 104. The gateway device 104 can implement one or more data protection techniques, such as tokenization or encryption, based on the mapping. It should be noted that other embodiments of the system environment of FIG. 1 can include different, fewer, or additional components and devices than those illustrated herein. It should also be noted that in addition to mapping received data portions to interface fields, the functionalities described herein can equally apply to the mapping of received data portions to data elements, structured document elements or portions, dataset or spreadsheet entries or portions, and the like. In such instances, a gateway device 104 can encode the received data portions corresponding to the data elements, document elements or portions, dataset or spreadsheet entries, and the like. As used herein, the mapping between client interface fields and corresponding payload data portions can refer to a data table structure with, for each client interface field listed in a first table row and first table column, a payload data portion corresponding to the client interface field listed in the first table row and a second table column.

A client device 100 is a computing device capable of processing data as well as transmitting data to and receiving data from the other entities of FIG. 1 via the network 105. For example, the client device 100 can be a desktop computer, laptop computer, smart phone, tablet computing device, server, payment terminal, or any other device having computing and data communication capabilities, for instance as described herein. The client device 100 includes one or more processors, memory, storage, and networking components. The client device 100 is coupled to the network and can interact with other modules coupled to the network using software such as a web browser or other application with communication functionality. Such software can include an interface for communicating with the other modules via the network. The client device 100 may be configured to display one or more interfaces (for instance, a user interface within a web page, native application, or other interface), each including one or more data fields associated with particular data types or categories (such as a date, time, name of a user of the client device, credit card number, bank account number, username of the user, password of the user, or any other suitable data or data format). Data entered into the data fields is communicated from the client device 100 to the gateway 104 within a message using any suitable communication protocol. The data fields can be associated with an identifying tag or metadata such that the gateway device 104 can identify the data fields or data entered into the data fields (for instance, data entered into a data field can be associated with the identifying tag or metadata).

The server 102 is a computing device capable of processing data as well as transmitting data to and received data from the modules of FIG. 1 via the network 105. For example, the server 102 can be a desktop computer, laptop computer, smart phone, tablet computing device, web server, payment terminal, data center, hosted web site, or any other device having computing and data communication capabilities, for instance as described herein. The server 102 includes one or more processors, memory, storage, and networking components. The server 102 is coupled to the network and can interact with other modules coupled to the network using software such as a web browser or other application with communication functionality. Such software can include an interface for communicating with the other modules via the network. Like the client device 100, the server 102 can include an interface including one or more data fields, for instance within a native application, operating system, or database, and can be configured to store data associated with the one or more data fields. Data received or communicated by the server 102 can be associated with one or more data fields, for instance by being associated with an identifying tag or metadata associated with the data fields.

The network 105 connecting the various modules is typically the Internet, but can be any network, including but not limited to a local area network (LAN), metropolitan area network (MAN), wide area network (WAN), cellular network, wired network, wireless network, private network, virtual private network (VPN), direct communication line, and the like. The network can also be a combination of multiple different networks.

The gateway device 104 in the embodiment of FIG. 1 includes an interface module 120, an encoding module 125, a token tables storage module 135, a mapping engine 150, a form mappings storage module 155, and a security policy storage module 160. Although not illustrated in the embodiment of FIG. 1, the gateway device 104 can include additional modules or different modules to perform the functionalities described herein.

The interface module 120 is configured to provide an interface between entities external to the gateway device and modules within the gateway device. For instance, the interface module can receive data associated with one or more data fields from the client device 100, can protect the received data (for instance, using tokenization), and can provide the protected data to the server 102. The interface module can provide a graphic user interface (GUI) to entities external to the gateway device (for instance, via a display or a web page), and/or can provide a communicative interface configured to route received and protected data between the client device 100 and the server 102. The interface module can also provide an interface for communications between modules of the gateway device, for instance providing token tables stored in the token tables storage module 135 to the encoding module 125, and providing mappings generated by the mapping engine 150 to the form mappings storage module 155.

The encoding module 125 is configured to encode sensitive data (such as a portion of payload data corresponding to an interface field) and to store or transmit the tokenized data. In some embodiments, the encoding module 125 encodes one or more portions of sensitive data based on a security policy accessed from the security policy storage module 160 and using a mapping stored in the form mappings storage module 155. For example, for payload data received from a client 100 in response to the completion of an interface form, the encoding module 125 can access a security policy corresponding to the interface form stored in the security policy storage module 160, can identify one or more portions of the payload data corresponding to fields identified by the accessed security policy using a mapping corresponding to the interface form that maps portions of the payload data to fields, and implement one or more encoding techniques identified by the security policy and associated with particular data fields corresponding to the identified portions of payload data. As used herein, "payload data" refers to data output by a device in response to the entry of interface field data at the device.

One example data protection technique is SLT tokenization, though it should be noted that other forms of tokenization (such as DLT tokenization) can also be performed according to the principles described herein. The encoding module 125 selects a portion of the sensitive data to tokenize, and requests a token table from the token tables storage module 135 or generates a token table for use in tokenization and subsequent storage in the token tables storage module 135. As noted above, the encoding module 125 can receive a seed value, such as an initialization vector, for use in generating or selecting a token. The seed value can include a portion of the sensitive data, can be associated with the context of the tokenization operation (for instance, the identity of a user of the client device 100, the time/date of the tokenization request, and the like). It should be noted that in some embodiments, the encoding module 125 can request and receive a token table from the central encoding management module 110.

Upon accessing a token table, the encoding module 125 queries the token table with the value of the selected portion of the sensitive data to identify a token value mapped to the value of the selection portion, and replaces the selected portion of the sensitive data with the identified token value. The encoding module 125 can then transmit the tokenized data to an external entity (such as the server 102). The encoding module 125 can also store an association between the selected portion of the sensitive data and the received token in a DLT within the token tables storage module 135. For instance, if the middle eight digits of the credit card number "1234 5678 9012 3456" are replaced by the token "99887766", then the encoding module 125 stores a mapping between the value "56789012" and the token "99887766" in a DLT within the token tables storage module associated with the tokenization operation. Each time a subsequent tokenization operation is performed by the gateway device 104 using the DLT, a token table entry is created within DLT mapping the portion of the sensitive data replaced by the token to the token. It should be noted that each DLT stored within the token tables storage module 135 can include an index or identifier associated with a particular tokenization context, such as a portion of sensitive data, a time or date of tokenization request, an identity of a user of the client device 100, and the like.

As noted above, other example data protection techniques implemented by the encoding module 125 include encryption, data masking, data modification, and the like. In some embodiments, a security policy identifies a combination of data protection techniques associated with data fields, and the encoding module 125 implements the combination of data protection techniques on payload data portions corresponding to the data fields. For example, for a first field, the encoding module 125 can modify a first payload data portion corresponding to the first field with an initialization vector, and can tokenize the modified payload data portion, and for a second field, the encoding module 125 can encrypt a first portion of a second payload data portion corresponding to the second field and can obfuscate a second portion of the second payload data portion.

As used herein, data masking (or data obfuscation) is a process where original data is hidden by or replaced with random characters or data. To remain meaningful to applications (while still hiding it from those applications), data masking can retain some of the essential characteristics of the original data, such as a format or character set corresponding to the original data. In some embodiments, data masking can include substituting characters, shuffling characters, and the like. While cryptographic methods allow translation of data in both directions (from plaintext to ciphertext and vice-versa), data making may be unidirectional (e.g. data is masked for temporary viewing but the masked data does not need to be mapped back to the original data).

As used herein, data anonymization refers to the technique of converting clear text data into a non-readable (by humans) and irreversible form. For instances, IP addresses in Internet transactions may be anonymized upon historical log storage for subsequent analysis independent of the precise or actual values of the IP addresses. As used herein, hashing refers to a one-way (irreversible) method of mapping input data of arbitrary size to fixed size.

It should be noted that the data protection techniques as described herein are not limited to HTTP communications, but can also be applied to additional formats, including but not limited to: FTP, SFTP, SOAP, REST, ODBC, Message QUEUE, AMF, WekSocket, RTMP or any other protocol over TCP/IP, and UDP transport.

The central encoding management system 110 can interface with the gateway device 104 to perform a variety of encoding functions. For instance, the central encoding management system 110 can track tokens stored within DLTs at the gateway device, and can be queried by a client to determine if a token associated with a portion of sensitive data already exists within a DLT at another device to avoid potential token collisions. In embodiments where the encoding module 125 is configured to perform SLT tokenization, the central encoding management system 110 can provide one or more token tables to the gateway device 104, for instance periodically or in response to a request by the encoding module 125, and the gateway device can store the provided token tables in the token tables storage module 135 for subsequent use in tokenization. In addition to providing token tables for use by the encoding module 125, the central encoding management system 110 can provide encryption keys to the encoding module 125, for instance in response to a request by the encoding module 125, in response to an encryption operation being identified by an accessed security policy, and the like.

The mapping engine 150 is configured to generate mappings between fields of data entered within a client device interface and portions of data received from the client device 100 (for instance, portions of payload data transmitted from the client device 100 to the server 102 via the gateway 104), and store the generated mappings in a form mappings storage module 155. In some embodiments, the mapping engine 150 generates the mappings when the gateway 104 is configured to operate in a training mode. When the gateway 104 is subsequently configured to operate in a data protection mode, the encoding module 125 can use the generated mappings stored in the form mappings storage module 155 to identify portions of received data that correspond to fields identified by a security policy accessed from the security policy storage module 160, and can encode the portions of received data using one or more data protection techniques identified by the accessed security policy.

Each mapping generated by the mapping engine 150 can be specific and/or unique to and can correspond to a particular client device 100, to a particular interface displayed at the client device, to a particular application running at the client device, to a particular data type, to a location or time, and/or to a particular user of the client device. Likewise, a mapping generated by the mapping engine 150 can be used for multiple client devices, multiple users of the client devices, and the like. In some embodiments, each mapping is stored in conjunction with an identifier that identifies a client interface, a user of the client device 100, or the client device itself. In such embodiments, when data is received from a client device 100, the gateway 104 (configured to operate in a data protection mode) can identify the client device, the client device user, or the client device interface, and can query the form mappings storage module 155 using the identified client device, client device interface, or client device user, etc., to access a corresponding mapping.

As described below, to generate a mapping (when the gateway device 104 is configured to operate in a training mode), the mapping engine 150 can scan a client device interface to identify one or more data fields (for instance, by performing a graphical analysis of the interface to identify form fields, by scanning underlying code associated with the interface to identify fields, by scanning a structured document to identify document fields, and the like). In some embodiments, upon identifying interface fields, the mapping engine 150 can identify a data type corresponding to each field, data format requirements corresponding to each field (such as data lengths, data character requirements, etc), and the like. The mapping engine 150 can generate seed values for each identified data field (for instance, a unique seed value for each field, satisfying the data type or data format requirements corresponding to the field), and can receive payload data generated in response to the entry of the generated seed values within the interface fields.

The mapping engine 150 can identify a portion of the received payload data corresponding to each client interface field by scanning the payload data to identify the portion of the payload data that includes a seed value generated and entered into the corresponding interface field. The portion of the payload data including a seed value entered into a corresponding field can be mapped by the mapping engine 150 to the corresponding field within a mapping. For example, if a particular payload data field (e.g., a value between a particular pair of commas within a payload data body) or a set of bytes within the payload data are identified as including a seed value entered into an interface field, the portion of the payload data (the particular payload data field or set of bytes) is mapped to the interface field. When generating a mapping for a particular client interface, the mapping engine 150 can map a payload data portion to every client interface field, or can map payload data portions to a pre-selected subset of interface fields (such as interface fields associated with particular data types, particular data requirements, particular security requirements, and the like). The generation of a mapping of payload data portions to client interface fields is described below in additional detail.

The mapping engine 150 can scan data on a field-by-field basis in structured protocols and associated payloads (e.g. HTTP header fields, XML tags, etc). The mapping engine 150 can also scan unstructured or semi-structured data using pattern recognition or position offsets. For instance, received payload data can be parsed on a chunk-by-chunk basis, where a chunk can be one or more bytes, and can be variable or constant in size. The parsed data is then compared to a set of pre-known data patterns to determine if one or more chunks match a known data pattern. For example, a pattern matching rule written in the Unix "grep" regular expression format can take the form: "{01~[A-Za-z0-9+/=]*~}", which scans received data looking for strings that begin with the characters "{01~" and that end with the characters "~}" (such as the string "{01~Hello World~}"). As noted above, the mapping engine 150 can seed an interface field corresponding to a credit card number with the value "1234 456789 0123", and can scan corresponding payload data to identify the pattern "1234567890123", mapping the payload data portion including the value "1234567890123" to the credit card number field of the client interface.

The security policy storage module 160 stores security policies for use by the encoding module 125 to encode payload data received from the client device 100. In some embodiments, the security policies are received from the central encoding management system 110, for instance in response to the generation of a mapping for a particular client device interface by the mapping engine 150. Each security policy stored by the security policy storage module 160 can be associated with a particular client interface, client device, client device user, and the like. Accordingly, the encoding module 125 can query the security policy storage module 160 for a security policy corresponding to a particular client device interface, client device, client device user, and the like. Each security policy can specify one or more encoding operations to be performed on all or part of data entered into each of one or more client interface fields (and thus, to be performed on payload data portions corresponding to the each of one or more client interface fields).

Gateway Security Overview

A gateway device (or "security gateway", or simply "gateway") functions as a network intermediary that allows data deemed sensitive by the user or the administrator of a client device to be protected by the gateway such that the sensitive data remains protected while at-rest or in-use in a server domain.

A network architecture including a gateway device addresses a specific threat model where a server sits in a separate domain from the client device (or "client"). In this arrangement, the server is $3^{rd}$ party entity that provides certain services to a client that wishes to protect sensitive data from the server. This arrangement is commonly known as SaaS (Software as a Service) in the marketplace. The server resources are typically shared among multiple tenants (separate organizations using the server), which exposes the server to an additional set of attack vectors than that would be exposed when the client and server are part of the same administrative domain.

The consequence of the existence of this threat model is that the client cannot fully trust the server for all its data. Although the client cannot trust the server for all its data, the client still needs the services provided by the server for business reasons (cost efficiencies, on-demand access etc.). In order to meet the security objectives of an enterprise that uses the client, the client's overall data can be categorized in varying degrees of sensitivity in terms of needed strength of protection from the server. A subset of client data can be identified as sensitive and is targeted for protection.

The identification of sensitive data may be driven by a variety of factors depending on the application provided by the server. These factors may include business secrets, intellectual property, data classified as PII (Personally Identifiable Information), PCI DSS (payment card industry—data security standards) compliance, HIPPA (Health Insurance Portability and Accountability Act) compliance and compliance with data sovereignty/residency regulations.

The abovementioned threat model is addressed by deploying an 'in-line' gateway device in the client enterprise's trust/administrative domain (typically on the enterprise's physical premise or on a network fully controlled by or visible to the enterprise). The placement of the gateway in an enterprise's trust domain (along with the client) combined with enterprise's full control over the gateway (such as the gateway's keying material) can allow the gateway to be considered a trusted entity.

The gateway can be an off-the-shelf device (or application) that provides cryptography (among other) functions, or can be a specialized computing device configured to perform the operations described herein. The enterprise owns and controls the encryption keys, token tables, and other keying material (e.g. initialization vectors) used in the gateway. This architecture is premised on the client's trust in the gateway such that the gateway can be used for cryptography and other services that are made possible by this architecture.

An alternative to the 'on premise' gateway deployment model is the model referred to as SECaaS—security as a service—where the security function of the gateway is provided as a cloud service itself. In such a case, even though the gateway is deployed in a cloud, its trust relationship with the client remains the same.

The need for a network intermediary device such as a security gateway has originated due to the need to cope with the new threat models and the regulatory issues that have been exposed by the advent and mainstream adoption of cloud computing. Prior to the advent of cloud computing, individual enterprises deployed their servers and applications within their own private networks. This meant that the clients and servers were located in the same trust/administrative domain. Because of the security characteristics of the internals of an administrative domain, there were no threat models that existed due to the lack of trust between the client and server (the client trusted the server and vice-versa). Since everything was internal to the enterprise, the enterprise itself owned the liability of protecting data and there were fewer attack vectors and threats.

Figure 2:
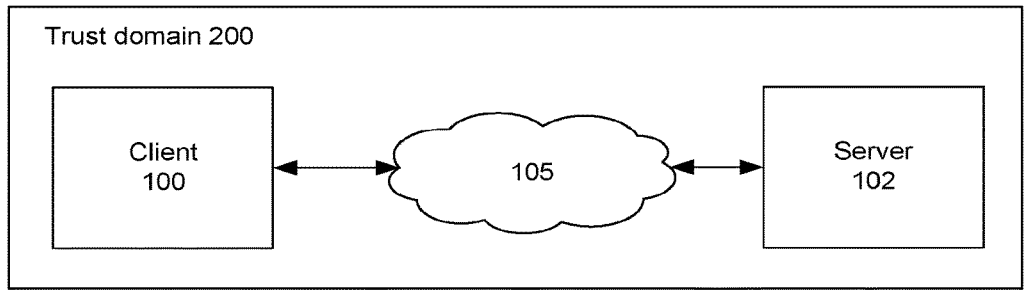
FIG. 2 illustrates the exchange of data between a client and a server within the same domain, according to one embodiment.

FIG. 2 illustrates the exchange of data between a client and a server within the same domain, according to one embodiment. In the embodiment of FIG. 2, the client 100, the server 102, and the network 105 are within the same trust domain 200. Thus, information can be shared between the client 100 and the server 102 without requiring the client 100 or the server 102 to encode data to prevent access to the unencoded before outputting the data (though it should be noted that various transport lay security protocols may be implemented, thus resulting in at least transport layer security encoding of the data). It the embodiment of FIG. 2, "trust domain" refers to a physical, logical, or network construct within which an entity has control of access, use, function, and security. For example, a trust domain can include all or a subset of a company's computer systems, terminals, or servers, as well as the network connecting such systems. In order to access a system within the trust domain, the company can require an accessing entity to possess a set of access credentials, to satisfy a set of security requirements, and the like.

Figure 3:
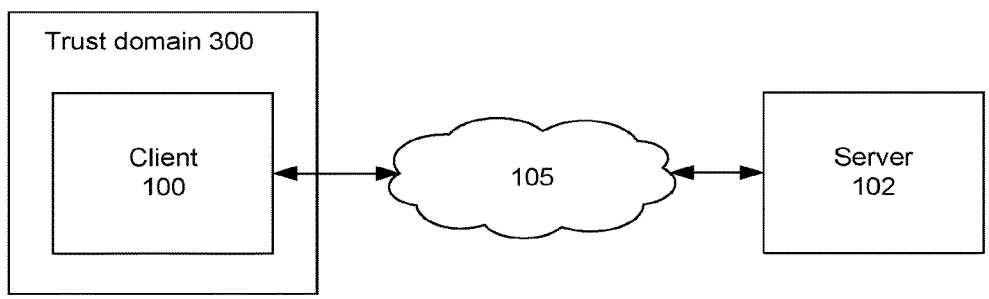
FIG. 3 illustrates the exchange of data between a client and a server within different domains, according to one embodiment.

Cloud computing introduces a variety of threat models with associated attack vectors and regulatory concerns. When cloud computing is introduced in the environment of FIG. 2, the trust domain no longer includes one or more entities of FIG. 2 and at least a part of the network connecting the entities. In other words, each of the client 100 and the server 102 reside in different domains. FIG. 3 illustrates the exchange of data between a client and a server within different domains, according to one embodiment. Cloud computing uses hosting servers and applications in administrative domains (owned by cloud service providers, CSPs) that are accessed over the Internet, and that are separate from the trust domain 300 of the client 100.

The threat models associated with cloud computing are not necessarily due to the use of the public Internet between the client and the server (which is addressed by the use of transport layer security mechanisms). The threat models associated with cloud computing are caused by the server being a third party server deployed in a different administrative domain and not in the enterprise's trust domain (the server 102 is no longer a dedicated property of the enterprise). The server 102 is often shared by multiple tenants (multiple entities employing one or more cloud computing services via the server) such that no single tenant has complete control over all of the security aspects of the server.

Related to the lack of trust between the client 100 and server 102 is the concern that a cloud server provider's ("CSP") service level agreements (SLAs) often dictate that the CSPs do not assume liability for security breaches or theft of enterprise's data while data lives in their infrastructure. In essence, while the enterprises can outsource their data and applications in cloud computing, they cannot outsource their liability associated with their data being compromised while it's in someone else's hands.

Often, an enterprise is unable to embed a security gateway 104 function within a client 100, because the client software is provided by the CSP vendor. In some cases, the client software is nothing but a set of webpages and scripts running in a web browser. The enterprise does not own the client software or the server software, but does own the proprietary or business critical data associated with the enterprise ("sensitive data" hereinafter). The enterprise often needs to protect sensitive data (among other non-sensitive data) provided within and to a third party application server controlled by some other administrative domain.

Figure 4:
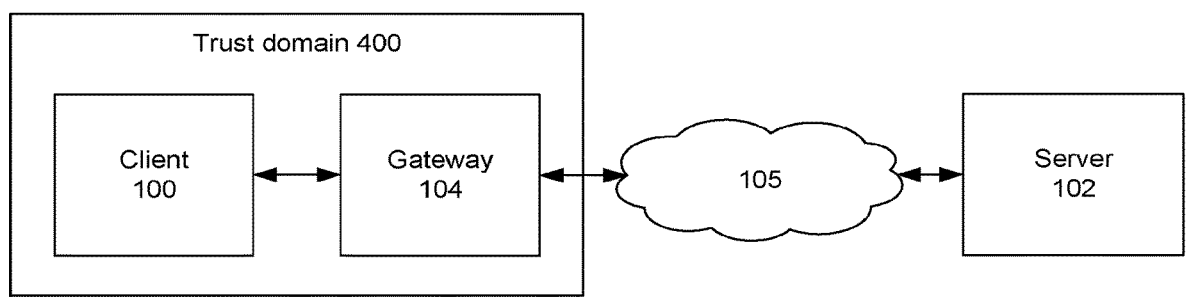
FIG. 4 illustrates the exchange of data between a client and a server within different domains via a gateway device, according to one embodiment.

FIG. 4 illustrates the exchange of data between a client and a server within different domains via a gateway device, according to one embodiment. As described above, the gateway 104 is a computing device configured to implement various data protection techniques. The gateway 104 supports all the networking protocols employed in communications between the client 100 and the server 102. The gateway 104 intercepts all the traffic between the client and server and protects a selected set of data elements that are deemed sensitive by the entity that controls the trust domain 400 using, for instance, tokenization, encryption, or other data protection techniques. It should be noted that in addition to implementing various data protection measures, the gateway 104 can also be configured to perform additional functions as described below.

Figure 5:
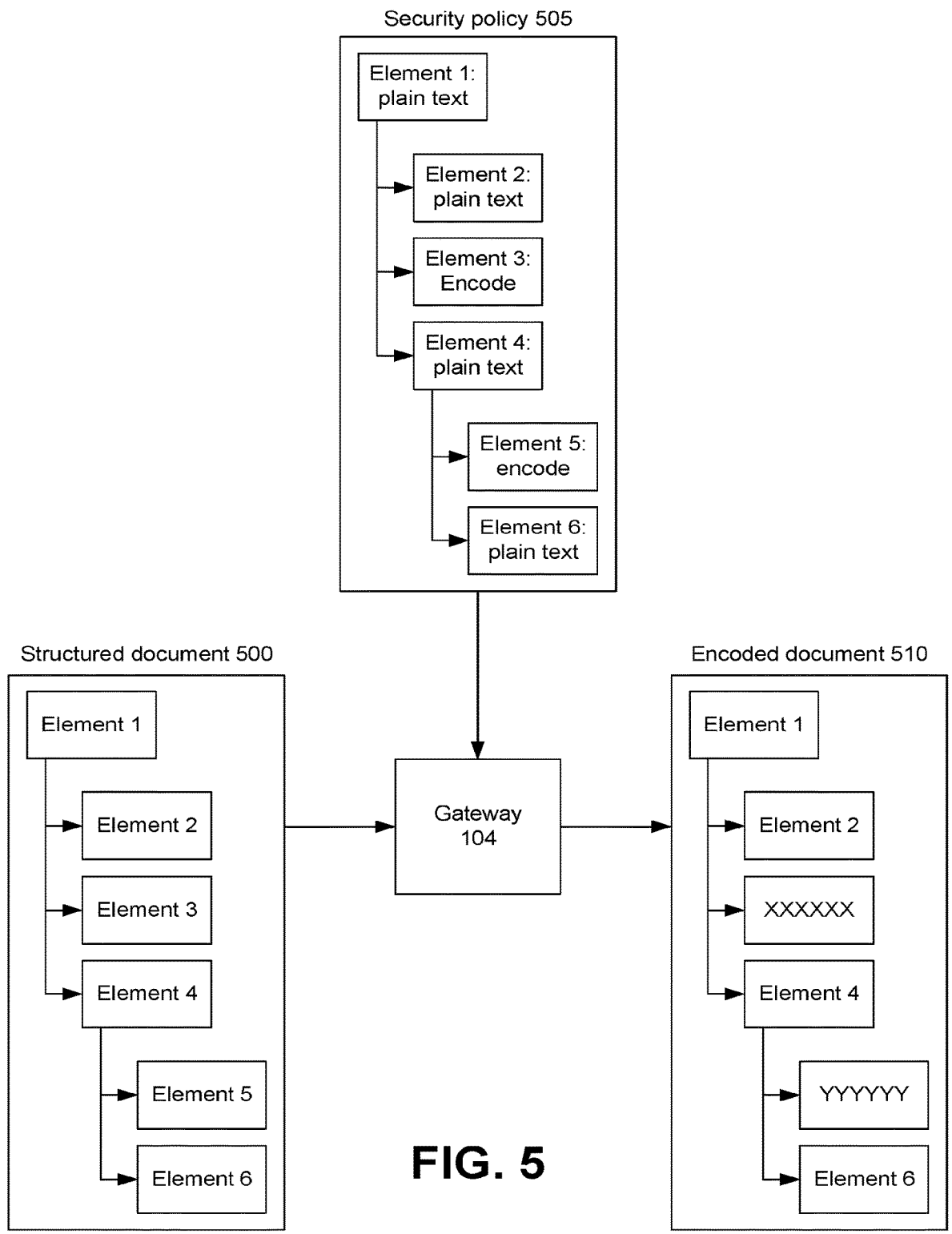
FIG. 5 illustrates the encoding of a structured document by a gateway device, according to one embodiment.

FIG. 5 illustrates the encoding of a structured document by a gateway device, according to one embodiment. As noted above, a data security policy can be accessed by the encoding module 125 from the security policy storage module 160. In the example embodiment of FIG. 5, the accessed security policy 505 corresponds to a structured document 500 (for instance, an HTML document including a plurality of data elements). The security policy 505 includes encoding rules arranged in a hierarchy that reflects the hierarchy of the elements of the structured document. As an example, the encoding rules can be configured using language specifications like XPath, JSONPath or XSLT.

The security policy 505 includes encoding rules for element 3 and element 5 of the structured document 500, and specifies that the remaining elements (element 1, element 2, element 4, and element 6) are to be left in plain text. The gateway 104, in response to receiving the structured document 500 (or payload data corresponding to the structured document 500) and in response to accessing the security policy 505, is configured to encoding the data values corresponding to element 3 and element 5, outputting the encoded document 510. Although the encoding operations identified by the security policy 505 are not specified in the embodiment of FIG. 5, the encoding operations can include any combination of tokenization, encryption, data masking, and the like, as described above. It should be noted that in addition to encoding individual data fields or elements, the gateway 104 can encode entire protocol headers or entire data payloads.

In embodiments where a security gateway is deployed in-line in a network topology, the gateway can also be configured to perform application-layer protocol interworking. For instance, an incoming HTTP request from the client may be translated by the gateway to multiple outgoing HTTP requests to the server. In order to be applicable in a variety of personal and business workflows in client/server architectures, the gateway can support various application-layer protocols in the TCP/IP model. These include but are not limited to HTTP, FTP, SFTP, SMTP, SSH, SCP, ODBC, SIP, RTMP, WebSocket, Action Message Format ("AMF"), JMS and Message Queue.

The gateway 104 can be configured to implement data protection techniques in both transactional and batch processing modes. The gateway 104 can operate in a transactional mode in data in-transit scenarios, such as when it is participating in protocol transactions (such as HTTP request/response transactions), and when users (or clients) actively interact with servers through the gateway. The gateway 104 can operate in the batch processing mode in data at-rest scenarios, such as end of day credit card settlements and new gateway deployments where legacy data needs to be transformed to align it with new data that will be transformed once the gateway is deployed.

Figure 6:
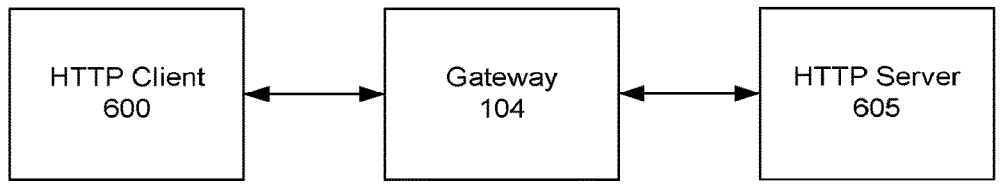
FIG. 6 illustrates a gateway device configured as an HTTP proxy server or an HTTP gateway server, according to one embodiment.

FIG. 6 illustrates a gateway device configured as an HTTP proxy server or an HTTP gateway server, according to one embodiment. When interworking HTTP(S) traffic flows between an HTTP client 600 and an HTTP server 605, the gateway 104 can operate as either an HTTP Proxy server (either a transparent or a non-transparent proxy server) or an HTTP gateway, for instance according to the definition of these entities in IETF RFC 2616 (Hypertext Transfer Protocol—HTTP 1.1), the contents of which are included herein by reference in their entirety. When functioning as an HTTP gateway, the gateway 104 acts as the origin server for requested resources.

Figure 7:
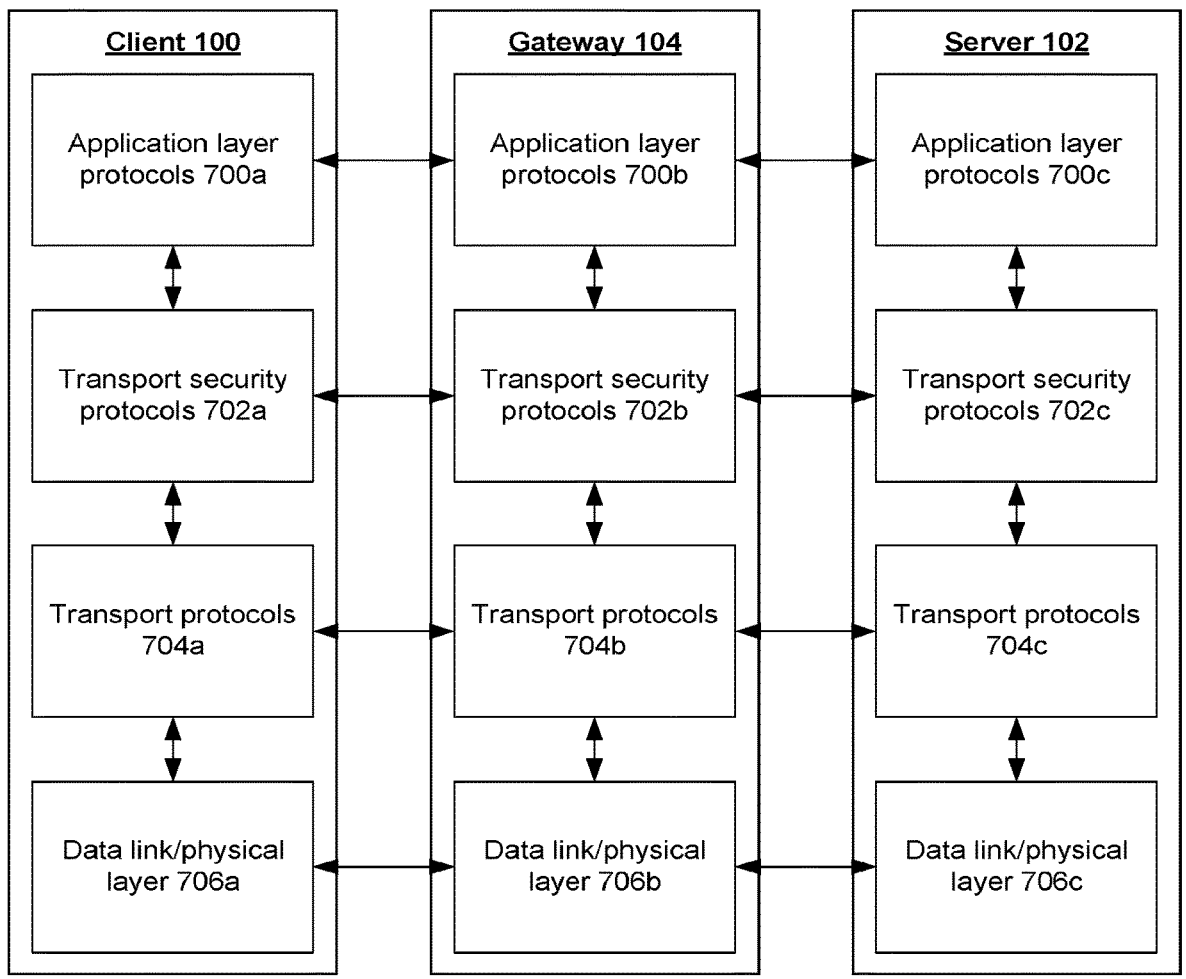
FIG. 7 illustrates a gateway protocol stack for a gateway device coupled between a client and a server, according to one embodiment.
Figure 8:
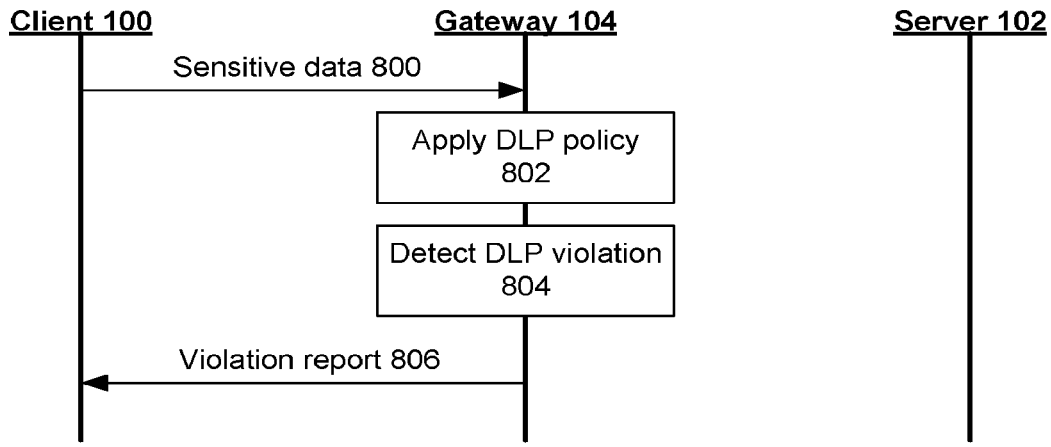
FIG. 8 illustrates a gateway device implementing a security policy for data in transit, according to one embodiment.

The gateway 104 can be implemented in the middle of a transport layer with an encrypted communication protocol, such as TLS/SSL. The TLS mechanisms allow two network entities to securely communicate while being protected against eavesdropping and tampering. FIG. 7 illustrates a gateway protocol stack for a gateway device coupled between a client and a server, according to one embodiment. The gateway 104 of FIG. 8 is equipped with a TLS protocol stack, and is configured to participate in secure communications between the client 100 and the server 102. Each of the client 100, the gateway 104, and the server 102 implement application layer protocols (700a-700c), transport security protocols (702a-702c), transport protocols (704a-704c), and a data link/physical layer (706a-706c). As shown in the embodiment of FIG. 8, the gateway 104 can receive application layer protocol communications from the client 100 and the server 102, transport security protocol communications from the client and the server, transport protocol communications from the client and the server, and data link/physical layer communications from the client and the server. In other words, the gateway 104 can receive any type of communication from the client 100 intended for the server 102, can modify or encode such communications, and can forward them on to the server when modified/encoded.

Data loss/leak prevention (DLP) is a mechanism for detecting potential data breaches and data theft. Data leak incidents are characterized by sensitive data being provided to or accessed by unauthorized parties either by malicious intent or inadvertent mistake. The gateway 104 can implement DLP functionality in a data in-transit scenario or a data at-rest (or data in-use) scenario. A DLP policy may define methods of detecting leaked or lost data, for instance using digital signatures, pattern matching, meta data mapping, or any other suitable technique. Accordingly, the gateway 104 can implement data inspection, scanning, and pattern recognition mechanisms to perform cryptographic or other kinds of data transformations according to DLP protocols. When operating in a DLP mode, the gateway 104 can transform sensitive data by erasing it from received communications, and can generate appropriate alerts such that a security violation can be traced to its origin and corrected. As used herein, "scanning" refers to the analysis of data to identify portions of the data, for instance using pattern matching, keyword matching, data type/format matching, and the like. For example, if the string "SSN" is found in received data, the portion of the data associated with the string "SSN" can be flagged as a social security number.

FIG. 8 illustrates a gateway device implementing a security policy for data in transit, according to one embodiment. In the embodiment of FIG. 8, the client 100 improperly (either inadvertently or maliciously) tries to transfer sensitive data 800 outside of the client's enterprise and/or a client's trust domain to a server 102. The gateway 104 proactively scans the communication content in real-time while applying 802 a DLP policy. When the gateway 104 detects 804 a violation of the DLP policy in response to the scanning (for instance, by identifying a type of sensitive data 800 being transferred, the transfer of which is prohibited by the DLP policy), the gateway 104 proactively blocks the sensitive data from being transferred to the server 102. The gateway 104 then generates a violation report 806 detailing the violation of the DLP policy, and provides the report to the client 100.

Figure 9:
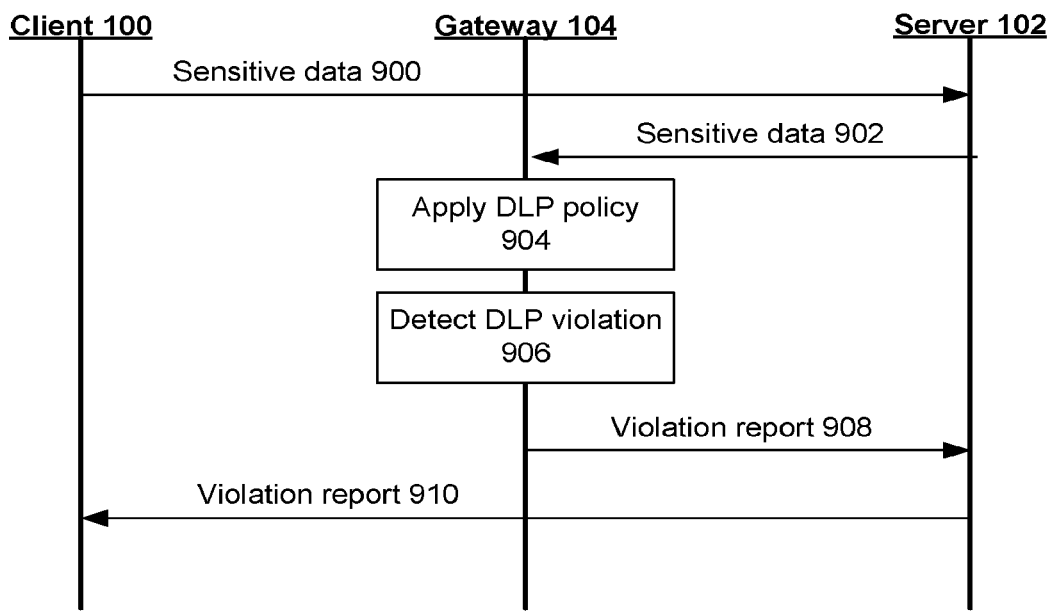
FIG. 9 illustrates a gateway device implementing a security policy for transmitted data received at or stored by a server, according to one embodiment.

FIG. 9 illustrates a gateway device implementing a security policy for transmitted data received at or stored by a server, according to one embodiment. In the embodiment of FIG. 9, sensitive data 900 has been transmitted from the client 100 to the server 102, outside of the client's trust domain. In this case, the gateway 104 can implement a DLP policy retroactively, after the transfer of the sensitive data 900. The server 102 provides the sensitive data 902 to the gateway 104, which applies 904 the DLP policy, for instance by scanning the sensitive data 902 to determine if the sensitive data includes one or more types of data or data portions identified by the DLP policy as restricted from transfer outside the client's trust domain. In response to detecting 906 a violation, the gateway 104 generates a violation report 908 and provides the violation report to the server 102, which in turn provides the violation report 910 to the client 100. In some embodiments, the gateway 104 provides a violation report directly to the client 100.

The gateway 104 described herein can also be configured to apply the communications scanning techniques (as described herein) to detect viruses and malware in communications received by the gateway. For instance, the gateway 104 can perform deep packet inspection to identify signatures or patterns known to be associated with malware, viruses, bots, Trojans, and the like. The gateway 104 can block the content from being transmitted to a destination node (such as a server 102 or the client 100).

It should be noted that although the gateway 104 is described herein as a specialized computing device specifically configured to perform the network-based communications described herein, certain functionalities of the gateway can also be implemented in an 'off-line' software application. For instance, in historical batch data processing and the implementation of a DLP policy, the gateway 104 may access data through non-network based means, such as custom APIs, protocols, or files. In some embodiments, the gateway 104 is coupled between a client 100 and a server 102 and receives communications between the client and server in real-time, but performs the data protection and other functions described herein on the received data in batches.

Gateway Data Protection Overview

The gateway 104 can receive sensitive data from a first system, identify sensitive data received at the gateway 104, and implement one or more data protection techniques on the identified sensitive data before providing the protected data to a second system. As noted above, "gateway" can refer to both a logical function that exists in any location along the client-to-server communication path (such as within the client device 100 as a native application or web browser extension, or within the server 102 as a server extension or server), and/or a specialized computing system specifically configured to perform the functionalities described herein. The gateway 104 can be implemented within a separate cloud service (SECaaS), or can be implemented within inside the administrative domains of the first or the second system.

The gateway 104 is configured to identify sensitive data elements in client/server communication, and to map the identified sensitive data elements from one or more rendered data fields in a client user interface to their encapsulation in wire protocol data structures communicated between the client and the server. The gateway 104 applies a security policy to protect the identified sensitive data elements communicated between the client 100 and the server 102, allowing data deemed sensitive by the client to be hidden from the server and vice-versa.

In a first example, the gateway 104 protects data received from the client 100 and identified as sensitive from visibility by the server 102. The gateway 104 applies a security policy to protect the identified sensitive data after it is sent by the client 100 but before it is received by the server 102. Once the identified data is protected (e.g., converted from plaintext to ciphertext using encryption, tokenization, data masking, and the like), such data then remains protected while stored at or in use in the server's domain. The gateway 104 can decode the protected data to obtain the original data when it is sent from the server 102 back to the client 100. In a second example, the gateway 104 protects data received from the server 102 and identified as sensitive from visibility by the client 100 using similar data protection techniques.

In certain conventional systems, data entered in a sensitive field at a client (such as a credit card number) is encoded and serialized at some location within other data transmitted from the client to a server (such as a payment server). In such systems, intermediary gateways cannot identify the encoded credit card number within the serialized data stream as corresponding to the sensitive data field.

The gateway 104 described herein identifies unique values associated with interface forms and fields within the forms, identifies such values within a network message payload (such as a communication from a client 100), and applies data protection policies to field data associated with the forms and form fields associated with the identified values. Accordingly, the gateway 104 enables a correlation between data entered into a particular field in a user-facing form and a corresponding parameter value in the network protocol associated with the particular field.

As described above, the gateway 104 is configured to map sensitive fields of data between a user facing client interface to an encoded representation of those fields in network protocol formats between the client 100 and the server 102. In some embodiments, the gateway 104 creates and stores such a mapping between fields and encoded representation of the fields in a communication for subsequent use. Alternatively, the gateway 104 can receive such a mapping from an external entity for use in identifying sensitive fields of data within communications. The mapping can be used by the gateway 104 to identify sensitive data fields within received data, and to protect data elements corresponding to the identified fields from being transparent or visible to a destination system associated with the communication.

In some embodiments, the implementation of the gateway 104 described herein requires no modifications to the existing client and server software. Further, in some embodiments, the gateway 104 can be implemented without prior knowledge of the implementation of the client and server software or the structure of the message payload (schema) exchanged between the client 100 and the server 102. These embodiments beneficially allow the gateway 104 to be inserted between existing client/server architectures for protecting data within communications between the client 100 and server 102.

It should be emphasized that although reference is made herein to interface fields, in practice, the mapping generated by the gateway 104 is not limited to fields corresponding to UI field boxes, but can include other portions of structured or unstructured data. For instance, for email content entered into an email interface at the client 100, the gateway 104 can scan the email body, can identify portions of the email containing sensitive data (such as phone numbers, social security numbers, credit card numbers, etc.), and can map the identified email portion to a portion of the payload corresponding to the email received by the gateway. Accordingly, "fields" as used herein can refer to any data portion entered at or provided by a system coupled to the gateway 104.

In a training mode, the client 100 can fill fields in a form using known data, and the gateway 104 can identify the location of the known data within a received communication from the client. The gateway 104 can then generate a mapping (or can add to an existing mapping) that associates (or "maps") the locations or elements of the known data within the communication to the corresponding fields of the form. In some embodiments, the client 100 includes a form field value generator and a client application container. The client application container fills form fields using unique values generated by the form field value generator, and submits the form data to the server though the gateway in a communication. In some embodiments, the client application container is configured to emulate a user or user patterns in filling the forms with data. The unique values can be any value recognizable within communicated data, for instance values that would normally not occur in network communication protocol headers and payloads.

In the training mode, the gateway 104 is configured to record all traffic sent from the client to the server. Unique values generated by the unique value generator and used to fill the form fields are communicated to the gateway 104, and the gateway searches the received and recorded traffic for the unique values to identify the fields. The gateway 104 then maps the portion of the communication (such as a portion and location of a data string within the communication, one or more data elements within the communication, or the like) including each unique value to a corresponding field of the form presented at the client 100.

The process of filling form fields with unique values can be performed manually without the use of a container. In such embodiments, a user can enter known values into form fields, and can identify portions of communication data as correlative to particular fields by identifying the known values within the communicated data. The gateway 104 can also be configured to record envelope data (such as HTTP message headers) in addition to payload data within communications received at the gateway. Recorded envelope data can be used by the gateway 104 to identify additional parameters associated with field values for use in mapping communicated data portions to field values.

Figure 10A:
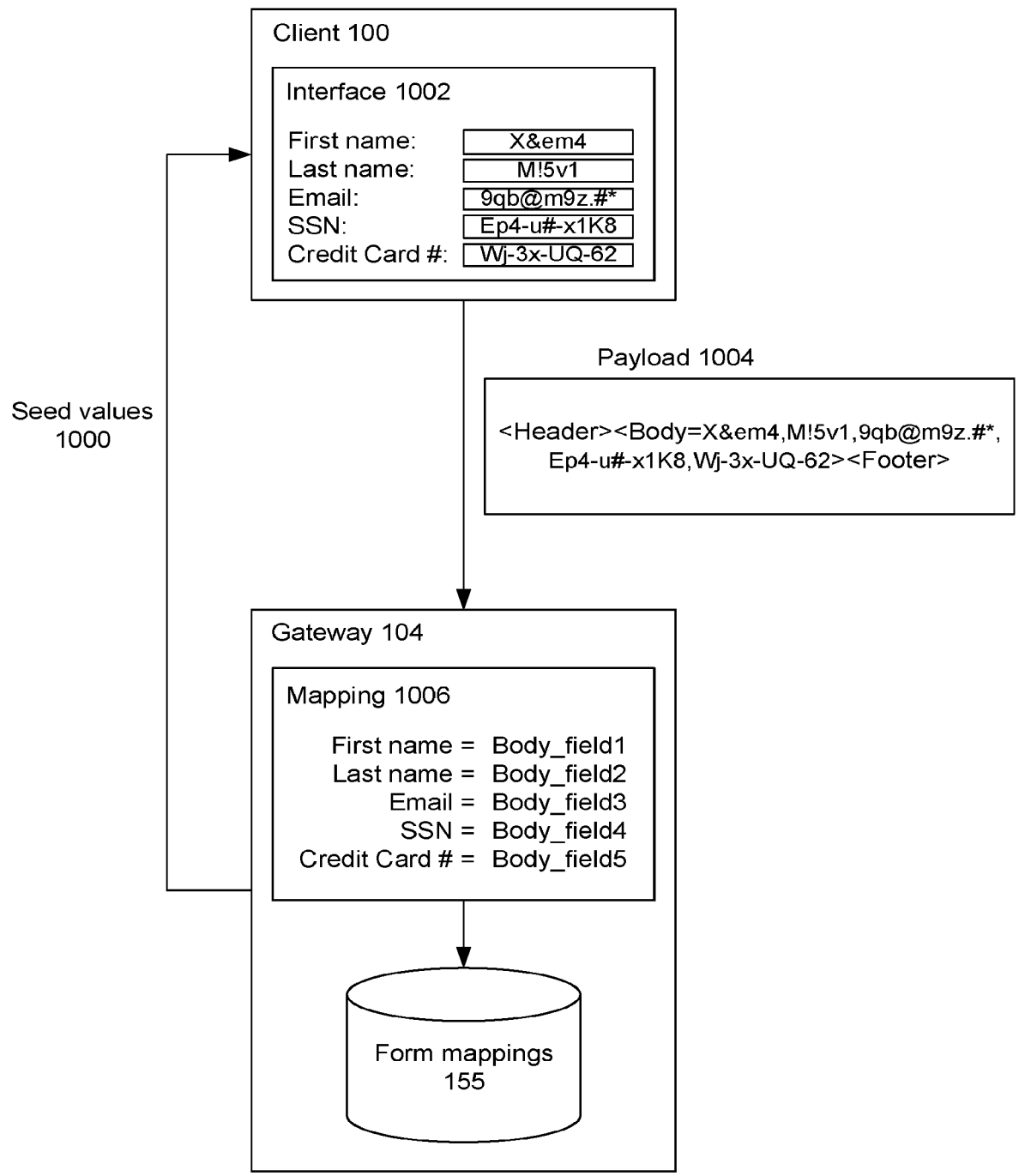
FIG. 10a illustrates the generation of a payload data portion-to-client interface field mapping by a gateway device, according to one embodiment.

FIG. 10*a* illustrates the generation of a payload data portion-to-client interface field mapping by a gateway device, according to one embodiment. In the embodiment of FIG. 10*a*, the gateway 104 is configured to operate in a training mode, and the gateway 104 generates seed values 1000 for entry in the fields of an interface 1002 at the client 100. In the embodiment of FIG. 10*a*, the interface 1002 includes five fields. The value "X&em4" is entered in the "first name" field, the value "M!5v1" is entered in the "last name" field, the value "9qb@m9z.#*" is entered in the "email" field, the value "Ep4-u #-x1K8" is entered in the "SSN" field, and the value "Wj-3x-UQ-62" is entered in the "Credit Card #" field. The seed values 1000 can be randomly generated, can include characters from any character set, can include characters from a limited character set based on character requirements for a particular field (for instance, by limiting the characters of the seed values for an "age" field to numeric characters only), can include a format based on a format requirement for a particular field (for instance, by limiting values to an "xxx@yyy.zzz" format for an "email address" field), or can satisfy any other seed value requirement associated with a particular field.

In the embodiment of FIG. 10*a*, the interface 1002 generates a payload 1004 including a header, a footer, and a payload body between the header and the footer, with each of the five seed values entered into the interface 1002 included within the payload body, each separated by a comma. The gateway 104, in response to receiving the payload 1004, scans the payload to identify the portion of the payload corresponding to each field of the interface 1002. The gateway 104 then generates a mapping 1006, which, in the embodiment of FIG. 10*a*, maps the first field of the payload body ("body_field1", the portion before the first comma) to the "first name" field, maps the second field of the payload body ("body_field2", the portion between the first comma and the second comma) to the "last name" field, and so forth. The generated mapping 1006 is then stored in the form mappings storage module 155.

As noted above, the mapping can be specific or unique to the client 100 or the server 102, to an organization associated with the client or the server, to the interface or form in which data is entered at the client, to particular interface fields, to the gateway 104, to the user of the client, or to any other suitable data entry parameter. The mapping generated by the gateway 104 can be used in conjunction with a security policy to protect specific data fields. As noted above, the gateway 104 can protect sensitive data using, for example, encryption, tokenization, or any other suitable data protection technique. The security policy used by the gateway 104 can include one or more rules for each of one or more data fields mapped to a portion of communicated data. Such rules can specify data protection operation types and parameters, and in some embodiments are customizable by a user of or entity associated with the gateway 104, the client 100, or the server 102.

Figure 10B:
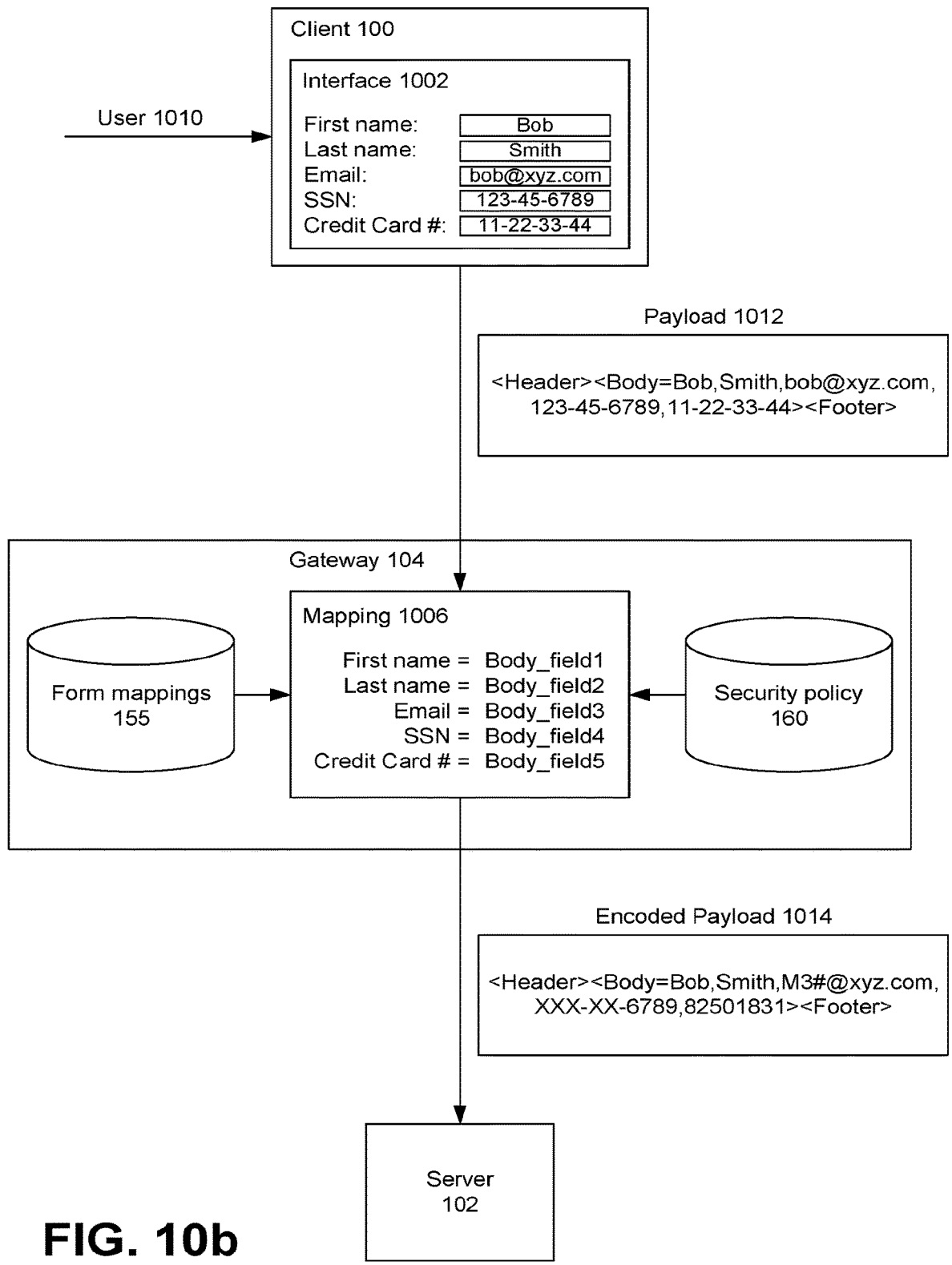
FIG. 10b illustrates the encoding of interface data using the mapping of FIG. 10a, according to one embodiment.

FIG. 10*b* illustrates the encoding of interface data using the mapping of FIG. 10*a*, according to one embodiment. In the embodiment of FIG. 10*b*, the gateway 104 is configured to operate in a data protection mode. A user 1010 enters information into the fields of the interface 1002, and a payload 1012 is output by the client 100 in response. In the embodiment of FIG. 10*b*, the value "Bob" is entered into the "first name" field, the value "Smith" is entered in the "last name" field, the value "bob@xyz.com" is entered into the "email" field, the value "123-45-6789" is entered into the "SSN" field, and the value "11-22-33-44" is entered into the "credit card #" field.

In response to receiving the payload 1012, the gateway 104 accesses a mapping corresponding to the interface 1002 from the form mappings storage module 155. The gateway 104 also accesses a security policy 160 corresponding to the interface 1002 from the security policy storage module 160 (though it should be noted that in other embodiments, a security policy can be accessed based on a data type or category associated with one or more fields of the interface 1002). In the embodiment of FIG. 10*b*, the accessed security policy specifies that the "first name" and "last name" fields are to be left in plain text, the local component of the value of the "email" field is to be encoded, each of the first five digits of the value of the "SSN" field are to be obfuscated with the value "X", and the value of the "credit card #" field is to be encoded using character-type preserving encryption. Accordingly, in response, the gateway 104 outputs the encoded payload 1014 to the server 102. The payload body includes the value "Bob, Smith, M3 #@xyz.com, XXX-XX-6789,82501831"

Figure 11:
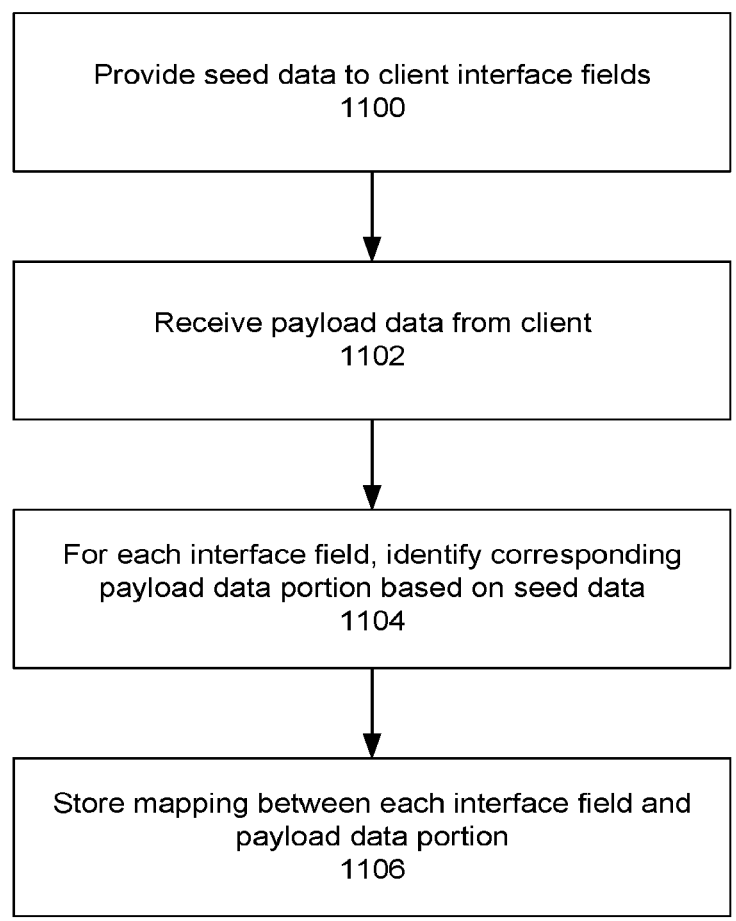
FIG. 11 illustrates a method of generating a payload data portion-to-client interface field mapping, according to one embodiment.

FIG. 11 illustrates a method of generating a payload data portion-to-client interface field mapping, according to one embodiment. See data is provided 1100 to the interface fields of a client device interface, for instance from a gateway configured to operate in a training mode. In response, payload data corresponding to the data entered within the interface is received 1102. For each interface field, a corresponding payload data portion is identified 1104, for instance by scanning the payload data for seed values entered within the interface fields. A mapping between each interface field and a corresponding payload data portion is generated and stored 1106.

Figure 12:
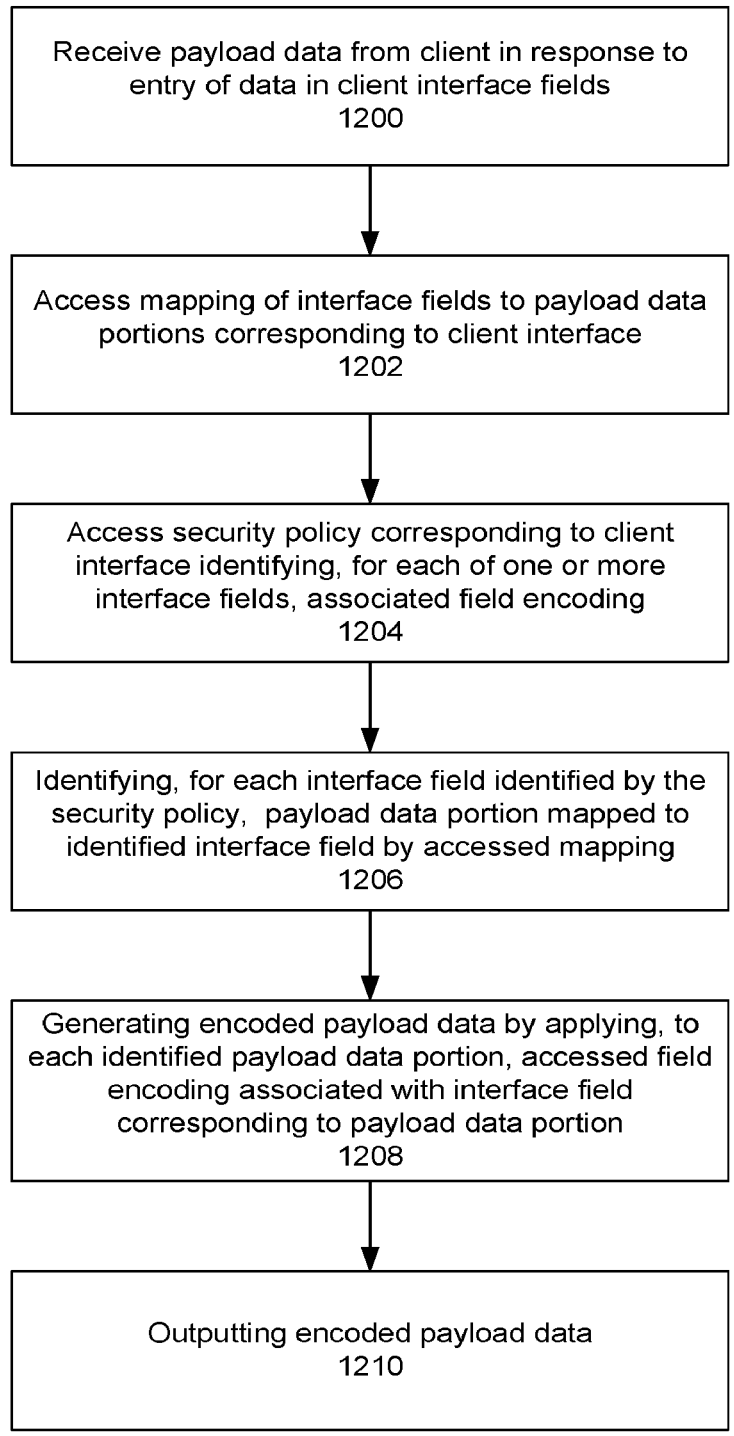
FIG. 12 illustrates a method of encoding interface data using the mapping of FIG. 11, according to one embodiment.

FIG. 12 illustrates a method of encoding interface data using the mapping of FIG. 11, according to one embodiment. Payload data is received 1200 from a client in response to the entry of data in client interface fields, for instance by a user of the client. The payload data is received at, for instance, a gateway configured to operate in a data protection mode. A mapping that maps interface fields to payload data portions corresponding to the interface is accessed 1202. A security policy corresponding to the interface is accessed 1204. The security policy identifies, for each of one or more interface fields, one or more field encodings or data protection techniques.

For each interface field identified by the security policy, a payload data portion mapped to the identified interface field is identified 1206 by querying the accessed mapping. Encoded payload data is generated 1208 by applying, to each identified payload data portion, the field encodings identified by the security policy associated with the interface field corresponding to the identified payload data portion.

The encoded payload data is then outputted 1210, for instance to a server located in a different trust domain than the client Data Computation in a Multi-Domain Cloud Environment Local, distributed, and cloud network architectures can include both trusted and untrusted entities. A trusted entity is an entity within a trusted domain, for instance an enterprise domain including a network of computing systems corresponding to the enterprise, each subject to the scrutiny and data security policies of the enterprise. Likewise, an untrusted entity is an entity within an untrusted domain or external to a trusted domain. Entities outside of a trusted domain can store encoded data on behalf of a trusted entity without being able to decode the data, and can provide services that require the performance of one or more operations on the encoded data. The entities outside a trusted domain can include cloud service providers, clients coupled to the trusted domain, and applications running on a device but outside of a trusted domain established within a device.

Often, untrusted entities need access to the unencoded or plaintext data in order to perform certain operations on the data. However, exposing unprotected data to such entities can result in the malicious interception and use of such data by the entities or (for example) by other entities able to take advantage of security deficiencies. As described herein, an operation and encoded data can be provided or identified by an entity outside a trusted domain to an entity within the trusted domain, and the trusted domain entity in turn can 1) decode the protected data, 2) perform the operation on the decoded data, 3) incorporate the operation result into an API or application corresponding to the entity outside of the trusted domain without providing the operation result to the entity in an unprotected form, 4) protect the operation result, and 5) can provide the protected result to the entity outside the trusted domain. Such a trusted domain entity can be implemented within the gateway device and architecture as described herein, or can be implemented between any entity within a trusted domain and any entity outside of the trusted domain. It should be emphasized that as used herein, "entity" can refer to a device, a system, or to a process or application running on a device or system. Similarly, it should be emphasized that an entity outside a trusted domain and an entity within a trusted domain can be located on the same device or within the same network.

As noted above, although data originating within a trusted domain can be protected by a gateway such that entities outside of a trusted domain cannot fully access the protected data, in some embodiments, such entities can provide services that require the performance of one or more operations on the data in an unprotected form. Such services include content editing, data searching, spreadsheet services, financial services, map services, social media services, and the like. Generally, the operations associated with such services require full access to the data in an unprotected form. For example, if a cloud service requires addition to be performed on data in the course of implementing the cloud service, the data must be decoded as addition cannot be meaningfully performed on encrypted data, tokenized data, and the like.

Example operations that can be performed in the course of providing or implementing cloud services include but are not limited to: common mathematical operations (such as addition, multiplication, averaging, etc.), indexing and searching operations, data manipulation operations, data identification operations (determining minimum or maximum data values), data matching operations, data sorting operations, query re-write operations, data masking operations, logical or other operations based on primitive processor functions (such as the AND function, OR function, XOR function, NOR function, left bit shift function, right bit shift function, etc.), location-based operations (such as route determinations, proximity operations, GPS-based operations), image and/or video editing operations, signal processing operations (such as deconvolution, signal filtering, and the like), or any suitable other operation can require access to data in a plaintext, raw, or unprotected form ("unprotected data" hereinafter). However, as also noted above, providing access to unprotected data to entities outside a trust domain can introduce any number of security or privacy concerns.

As used herein "trust domain" or "trusted domain" refers a pre-defined network of one or more computing systems or other entities configured to store, access, or process sensitive data that are subject to one or more security requirements. In some embodiments, the entities within a trusted domain collectively or individually implement one or more security protocols as described herein. In some embodiments, a trusted domain is associated with one or more trust levels, with each trust level associated with one or more security protocols. Accordingly, a trust domain implementing the strictest of security protocols can be considered a "high level trust domain", and a trust domain implementing less strict security protocols can be considered a "low level trust domain". In some embodiments, certain operations can only be performed by entities within a trust domain associated with a particular trust level. Likewise, the type of data protection operations performed by an entity within a trust domain on an operation result can be based on the trust level of the trust domain. It should be noted that in some embodiments, one or more trusted domains can be implemented within a computing network (such as an enterprise network, local area network, or cloud network). In such embodiments, certain entities ("trusted entities") within the computing network can belong to one or more trust domains while other entities ("untrusted entities") within the computing network do not belong to a trust domain.

As the data is protected from the entities external to the trust domain providing services requiring data manipulation or operations (or, in other words, because the entities do not have access to the unprotected data), the entities may not be able to perform operations or native computations on the protected data itself. To address the need of external entities to perform operations on protected data in providing one or more services to an owner or entity associated with the protected data ("client" or "data owner" hereinafter), an entity external to a trust domain with access to protected data ("external entity" or "requesting entity" hereinafter) can provide operations (or identifications of operations, or executable code corresponding to such operations) in association with protected data (or an identification of the protected data) on which the operations are to be performed to the data owner. The data owner and/or another entity within a trusted domain as described herein have access to the decoding mechanisms required to decode the protected data into plaintext data in order to perform the requested operations.

Figure 13:
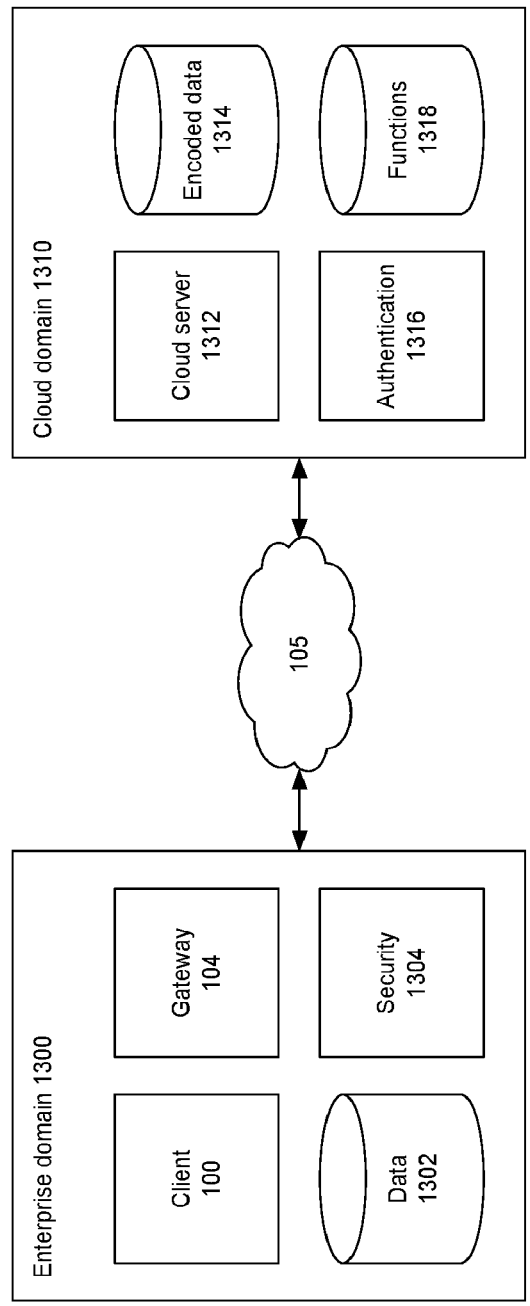
FIG. 13 is a system diagram for a multi-domain cloud environment, according to one embodiment.

FIG. 13 is a system diagram for a multi-domain cloud environment, according to one embodiment. In the embodiment of FIG. 13, an enterprise domain 1300 is communicatively coupled to a cloud domain 1310 via a network 105. In this embodiment, the enterprise domain 1300 is a trusted domain, and entities within the enterprise domain are trusted entities within the trusted domain and thus are untrusted entities. Likewise, the cloud domain 1310 and entities within the cloud domain are external to the trusted domain. In the embodiment of FIG. 13, the enterprise domain 1300 includes a client 100 and gateway 104 (for instance, the client 100 and gateway 104 of the embodiment of FIG. 1), a data storage module 1302, and a security engine 1304. The cloud domain 1310 includes a cloud server 1312, an encoded data storage module 1314, an authentication engine 1316, and a functions storage module 1318. It should be noted that in other embodiments, the environment of FIG. 13 can include different, fewer, or additional entities than those illustrated herein. Further, in some embodiments, one or more of the entities of FIG. 13 are incorporated into or implemented by another entity (for instance, the security engine 1304 can be implemented by the gateway 104, the gateway 104 can be implemented by the client 100, and the like).

In the embodiment of FIG. 13, enterprise data (such as data "owned", managed, or generated by the client 100, or data stored at the data storage module 1302) is encoded, for instance by the gateway 104 or the security engine 1304, is transmitted to the cloud domain 1310 (for instance, during the course of accessing a cloud service provided by the cloud server 1312), and is stored in the encoded data storage module 1314. Over the course of subsequent interactions between the client 100 and the cloud server 1312 corresponding to, for instance, the provision of cloud services by the cloud server at the request of the client, the cloud server may be requested or required to perform one or more operations corresponding to the services on data stored in the encoded data storage module 1314. As noted above, such operations may require access to the stored data in an unprotected form, though the cloud server 1312 may be unable to decode the protected data. In such embodiments, the cloud server 1312 can request the performance of the one or more operations from the client 100 (for instance, via the gateway 104), and can provide the one or more operations in conjunction with the request.

In response to receiving the request for cloud services, the cloud server 1312 identifies protected data stored within the cloud domain 1310 (for instance, data stored at the encoded data storage module 1314), and identifies one or more operations to be performed on the protected data based on the requested cloud services (for instance, operations stored at the functions storage module 1318). The cloud server 1312 can identify protected data based on the received request for cloud services (for instance, the request can identify the protected data itself), based on the identity of the client device or the user of the client device, based on the requested cloud service itself, based on previously accessed data, or based on any other suitable factor. In some embodiments, operations are identified based on the requested cloud services by querying a mapping or list of operations corresponding to the requested cloud service. In other embodiments, operations are identified by scanning an application or code corresponding to the requested cloud service to identify functions within the application or code. The functions storage module 1318 stores any operations required by any cloud services provided by the cloud server 1312, and can store each operation in conjunction with an identifier that uniquely identifies the operation. In some embodiments, the functions storage module 1318 stores executable code corresponding to each stored operation.

The identified operations and protected data are provided by the cloud server 1312 to an enterprise domain entity associated with the request for cloud services (the "requesting entity"). In some embodiments, metadata is included within the provided operations and protected data. The metadata can include a flag indicating that the data is protected, and can include information describing the protected data (such as the type of encoding used to encode the protected data, the identity of an encryption key used to encrypt the protected data, the identity of a token table used to tokenize the protected data, etc.) In some embodiments, in response to receiving the protected data and operations from the cloud server 1312, a requesting entity can identify a flag within the metadata indicating that the received data is protected, and can route the protected data to an enterprise domain entity (such as the security engine 1304) for decoding in response (for instance, using an encryption key or token table identified by the metadata). Similarly, the metadata can include a second flag indicating that one or more operations are provided in conjunction with the protected data, and the requesting entity can, in response to identifying the second flag, route the received data and operations to an entity (such as the gateway 104) for the performance of the operations.

In some embodiments, a security protocol defining requirements for providing data and operations from the cloud server 1312 to a requesting entity within the enterprise domain 1300 can be implemented between the enterprise domain 1300 and the cloud domain 1310 in advance of the request for cloud services. In such embodiments, the cloud server 1312 can provide protected data and operations to a requesting entity within the enterprise domain 1300, the requesting entity can verify that the provision of the protected data and operations satisfies the requirements defined by the security protocol, and in response to determining that the security protocol requirements were satisfied, the requesting entity can decode the protected data and perform the provided operations.

The security protocol implemented between the enterprise domain 1300 and the cloud domain 1310 can further specify that particular operations identified by the cloud server 1312 for performance by a requesting entity must be performed by a particular enterprise domain entity (such as the client 100, the gateway 104, or any other entity) based on an identity of a user of a client, a role of the user, based on an environment or context in which cloud services are requested (such as a mobile environment, a payment environment, a data center environment, etc.), based on a type or identity of the client device itself, based on an identity of the cloud service provider or a type of cloud service requested, based on a type or security level of data being operated on, based on a geographic location of the client or any other entity within the environment of FIG. 13, based on a time of time or a date, based on a computational or bandwidth load of the client or the cloud server, based on a threat level to the client or the enterprise domain 1300, based on a blacklist of entities stored by the client or the gateway, or based on any other suitable factor.

Upon receiving the provided operations and the encoded data from the cloud server 1312, entities within the enterprise domain 1300 can 1) decode the encoded data, can 2) perform the provided operations to generate one or more operation results, can 3) incorporate the operation results into a cloud service, interface, application, or API running at, executed on, or accessible by the client 100, the gateway 104, or any other enterprise domain entity, and can 4) encode the operation results and provide the encoded operation results to the cloud server 1312 for storage. As will be discussed below, in some embodiments, the gateway 104 performs one or more of the following functions: the encoding and decoding of data, the performance of operations provided by the cloud server 1312, and the incorporation of the operation results into a cloud service, application, interface, or API provided by the cloud server 1312. Alternatively, the client 100 can perform one or more of these functions, either in conjunction with or independent of the gateway 104 (in some embodiments, the functionalities described herein are performed by entities within an enterprise domain 130 that does not include a gateway 104).

It should be noted that the client 100 or another enterprise domain entity can access and/or implement one or more cloud services through the cloud server 1312 by requesting, receiving, and executing an application, applet, or browser-based script (such as JavaScript) received from the cloud server. For instance, the cloud server 1312 can provide a maps-based cloud service, and can provide code related to the map service to, for example, the client 100. In response, the client 100 can execute the provided code and can generate a display map for presentation to, for example, a user of the client. Continuing with this example, the user may want to display on the map the distance between two mobile phones of employees of the enterprise associated with the enterprise domain 1300. In such embodiments, the GPS location of each mobile phone may be stored in a protected format at the encoded data 1314. The cloud server 1312, in response to such a request from the user, can provide the protected GPS coordinates and a distance operation to the client 100, the client can decode the mobile phone coordinates and can perform the distance operation on the decoded mobile phone coordinates, and can display on the map presented at the client the decoded coordinates and the determined distance between the mobile phones. This example beneficially enables a user of the cloud server 1312 mapping application to display the locations of the mobile phone and the distance between the two locations without giving the cloud server 1312 or any other entity outside of the enterprise domain 1300 access to the GPS coordinates of the mobile phones in an unprotected format.

Similarly, if a client 100 is displaying a spreadsheet interface provided by the cloud server 1312, the client can incorporate protected data stored at the encoded data storage module 1314 into the spreadsheet interface (by first receiving the protected data from the cloud server 1312 and decoding the protected data). The client 100 can then request, within the spreadsheet interface, to perform a mathematical operation on the displayed data, the cloud server 1312 can provide one or more operations to the client based on the request to perform the mathematical operation, and the client can perform the provided operations on the data and can display the operation result within the spreadsheet interface, all without giving the cloud server 1312 access to the data in an unprotected format.

In conjunction with requesting a cloud service provided by the cloud server 1312, the client 100 can identify protected data stored at the encoded data storage module 1314 for use in performing the operations identified by the cloud server 1312, for instance by providing one or more unique identifiers corresponding to the data. Upon receiving the protected data, the client 100 decodes the protected data. The client 100, being within the trusted domain, has access to security credentials and encryption/decryption algorithms required to decode the protected data into plaintext format. In some embodiments, the client 100 provides the protected data to the security engine 1304, which decodes the protected data, while in other embodiments, the gateway 104 decodes the protected data (either itself or through the security engine 1304) before providing the decoded data to the client 100. Once the protected data is converted to a plaintext format, the requested operations can be performed, for instance by the client 100, by the gateway 104, or by another entity within the enterprise domain 1300, generating one or more operation results. The plaintext operation results can be incorporated into a cloud service by the client 100 (for instance, for display to a user of the client), and can then be encoded, for instance by the client 100, the gateway 104, or the security engine 1304 using one or more encoding operations as described herein, resulting in protected operation result data. The protected operation result data can be provided to the cloud server 1312 for storage in the encoded data storage module 1314.

The cloud server 1312 can provide operations identified based on a requested cloud service to the requesting entity (e.g., the client 100, the gateway 104, etc.) in a number of ways. In some embodiments, providing operations to an entity within a trusted domain can involve providing the identification of one or more operations, providing an operation function (such as operation logic, code, description, and the like), providing operation description (such as providing mathematical operation definitions, data manipulation definitions, operation description, and the like), providing operation arguments (such as operation inputs, output definitions, and the like), or any other operation description.

In some embodiments, the cloud server 1312 can identify operations available to the requesting entity, for instance based on a pre-stored list of such operations, by querying operation tables based on a characteristic of the requesting entity (such as a requesting entity operating system, software or hardware available to the requesting entity, requesting entity system resources, and the like), by directly querying the requesting entity itself for a list of available operations or functions, or the like. In some embodiments, the cloud server 1312 can determine operations available to an additional entity within the enterprise domain 1300 other than the requesting entity, and can identify an operation available to the additional entity with an instruction to the requesting entity to retrieve the identified operation from the additional entity. After determining if an operation is available to the requesting entity, the cloud server 1312 can provide an identifier for the available operation (for instance, an operation name or unique identifier).

In some embodiments, if an operation identified by the cloud server 1312 required for a cloud service request is not available to the requesting entity, the cloud server 1312 can decompose the identified operation into a set of primitive operations (sub-operations) that, when combined and/or performed in a particular order, are equivalent to the identified operation. For example, if the identified operation is a multiplication operation, the cloud server 1312 can break the multiplication operation into a series of addition operations such that, when the addition operations are performed, the operation result is equivalent to an operation result from the multiplication operation. In such embodiments, the cloud server 1312 can, responsive to determining that each of the set of primitive operations are available to the requesting entity, identify each of the set of primitive operations to the requesting entity in conjunction with instructions on how to combine the set of primitive operations in order to achieve the functionality of the identified operation.

In some embodiments, the cloud server 1312, in response to determining that an operation identified based on a requested cloud service from a requesting entity, can utilize a remote procedure call ("RPC") or remote method invocation ("RMI") to enable the requesting entity to perform one or more identified operations. In such embodiments, the RPC or RMI is implemented by the requesting entity such that, from the perspective of the requesting entity, the operation identified by the cloud server 1312 and corresponding to the RPC or RMI appears to be a locally-requested/locally-originating operation. In some embodiments, the cloud server 1312 provides a function name (corresponding to function logic or code accessible to the requesting entity) and one or more function arguments (X1, X2, . . . Xn) to the requesting entity. In such embodiments, the function arguments can include protected data received from the cloud domain 1310 and decoded by an entity within the enterprise domain 1300. It should be noted that in some embodiments, function and argument communication protocols can include Web Services, HTTP, CORBA, JMS, XML-RPC, SOAP, REST, AMF, and the like.

In some embodiments, the entity within the trusted domain may not include a pre-existing implementation of one or more operations identified by the cloud server 1312 based on the requested cloud services. In such embodiments, the cloud server 1312 can provide operations to the requesting entity dynamically. In such embodiments, the cloud sever 1312 can provide operations to the requesting entity in the form of executable code instructions, application code, applet code, hardware or software logic description, interpreted scripts, DLLs, shared objects, executables (for execution using a native hardware instruction set), and the like. The requesting entity, in response to receiving code can scan the code to identify any threats posed by the execution of the code, and in response to a determination that the code is not malicious, can execute the code to perform the provided operations. In some embodiments, the requesting entity can provide the code to an entity within the enterprise domain 1300, such as the security engine 1304, for execution in a quarantined environment (e.g., an executable environment with limited resources and limited access to resources external to the quarantined environment) in order to increase the security of and lower the risk posed by executing the code.

The security engine 1304 can authenticate the cloud services provided by the cloud server 1312, operations provided by the cloud server for implementation by an enterprise domain entity, data provided by the cloud server in association with the provided operations, and/or any other communication by the cloud server. In some embodiments, the security engine 1304 implements a public key infrastructure for use in encrypting communications from the cloud server 1312 to enterprise domain entities. In some embodiments, the security engine 1304 can generate a session identifier (for instance, in response to a request for cloud services generally or for a particular cloud service specifically from the cloud server 1312) for use during the course of a communication session between an enterprise domain entity and the cloud server 1312. The session identifier can be provided to the cloud server 1312, and the cloud server can include the session identifier to a requesting entity in conjunction with provide one or more operations and protected data. The security engine 1304 can verify the session identifier prior to the performance of the operations by the requesting entity. Such use of session identifiers prevent the performance of unrequested and unauthorized operations provided by the cloud server 1312 by an enterprise domain entity, beneficially protecting enterprise domain entities for potential attacks by malicious entities.

In some embodiments, the authentication engine 1316 can implement an authentication protocol (for instance, OAuth) for use in authenticating communications between the cloud server 1312 and enterprise domain entities. In such embodiments, the authentication engine 1316 can provide access tokens to the security engine 1304 for use in requesting and accessing protected data stored in the encoded data storage module 1314. In some embodiments, the authentication engine 1316 digitally signs the API provided by the cloud server 1312, and the security engine 1304 authenticates the API before an enterprise domain entity performs operations provided by the cloud server 1312. In some embodiments, the security engine 1304, in response to detecting an attack or an unauthorized request to perform operations by the cloud server 1312, can notify enterprise domain entities (such as the client 100, the gateway 104, or additional entities not illustrated in the embodiment of FIG. 13) of the detected attack/unauthorized request. In response, the notified enterprise domain entities can block or blacklist requests from the cloud server 1312, can apply a heightened level of scrutiny or security protocols to communications from the cloud server, can limit access to or the implementation of cloud services provided by the cloud server, or can perform any other suitable security protocol.

Figure 14:
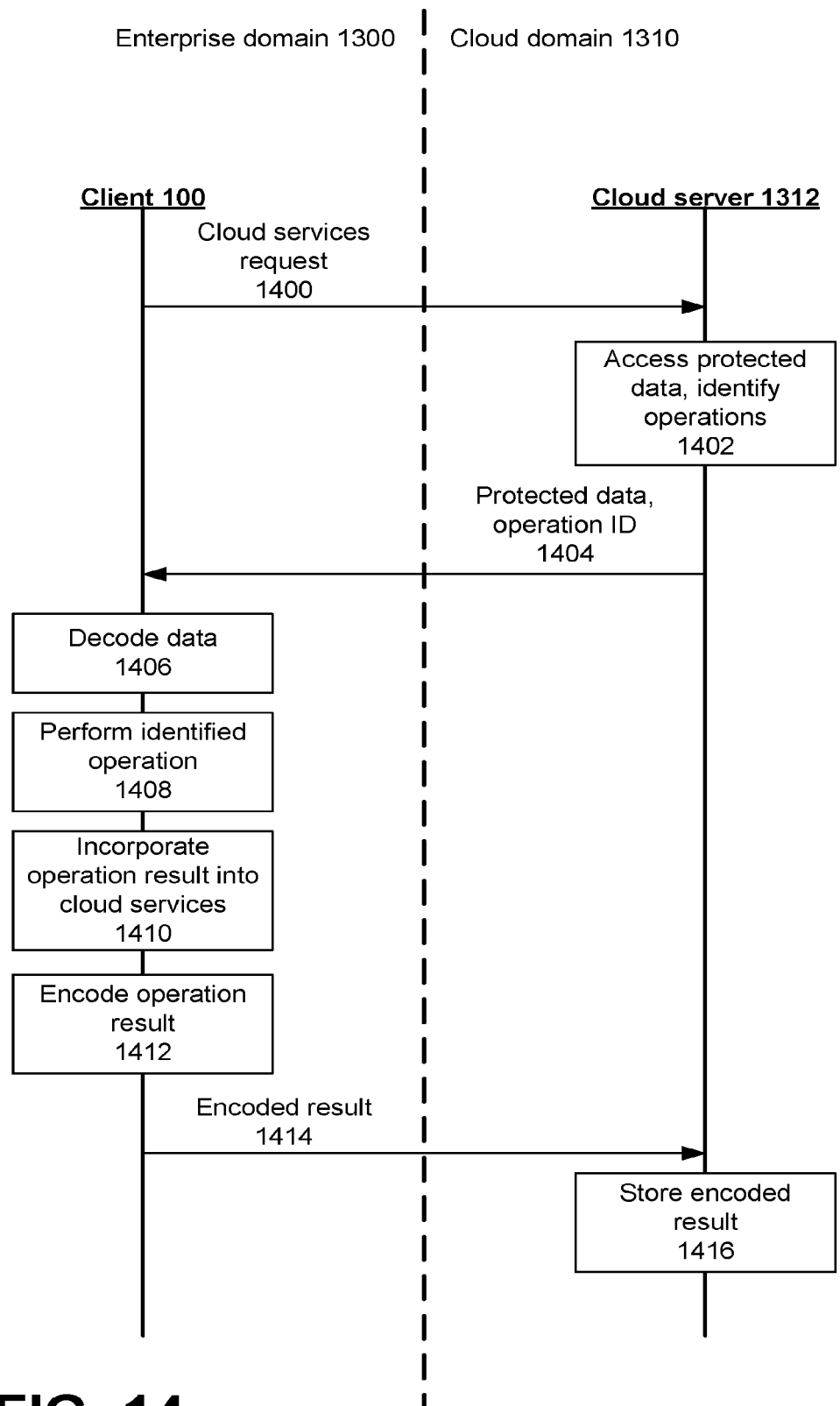
FIG. 14 illustrates a method of performing cloud service operations in a multi-domain cloud environment, according to one embodiment.

FIG. 14 illustrates a method of performing cloud service operations in a multi-domain cloud environment, according to one embodiment. In the embodiment of FIG. 14, a client 100 within an enterprise domain 1300 requests 1400 a cloud service from a cloud server 1312 within a cloud domain 1310. In response to receiving the request, the cloud server 1312 accesses 1402 data stored within the cloud domain 1310 (such as encoded data previously provided by the client 100) and identifies one or more operations to be performed on the accessed data based on the request. For instance, if the client 100 requests an image editing service provided by the cloud server 1312, the request can identify an encoded image storage at the cloud server, the cloud server can access the identified encoded image, and the cloud server can identify, for example, one or more image filter operations for performance by the client. The cloud server 1312 then provides 1404 the protected data and the identified operation (for instance by providing a unique identifier associated with the identified operation) to the client 100.

The client 100, in response to receiving the protected data, decodes 1406 the data and performs 1408 the identified operation on the decoded data. In embodiments where the cloud server 1312 provides an operation identifier, the client 100 can identify the operation based on the identifier, and can perform the identified operation. The client 100 incorporates 1410 the operation result into an application or interface associated with the requested cloud services (for example, if the requested cloud services include a spreadsheet application, the client 100 can perform a spreadsheet operation and can include the operation result in a spreadsheet field). The client 100 can encode 1412 the operation result, and provides 1414 the encoded operation result to the cloud server 1312. The cloud server 1312 then stores 1416 the encoded result.

Figure 15:
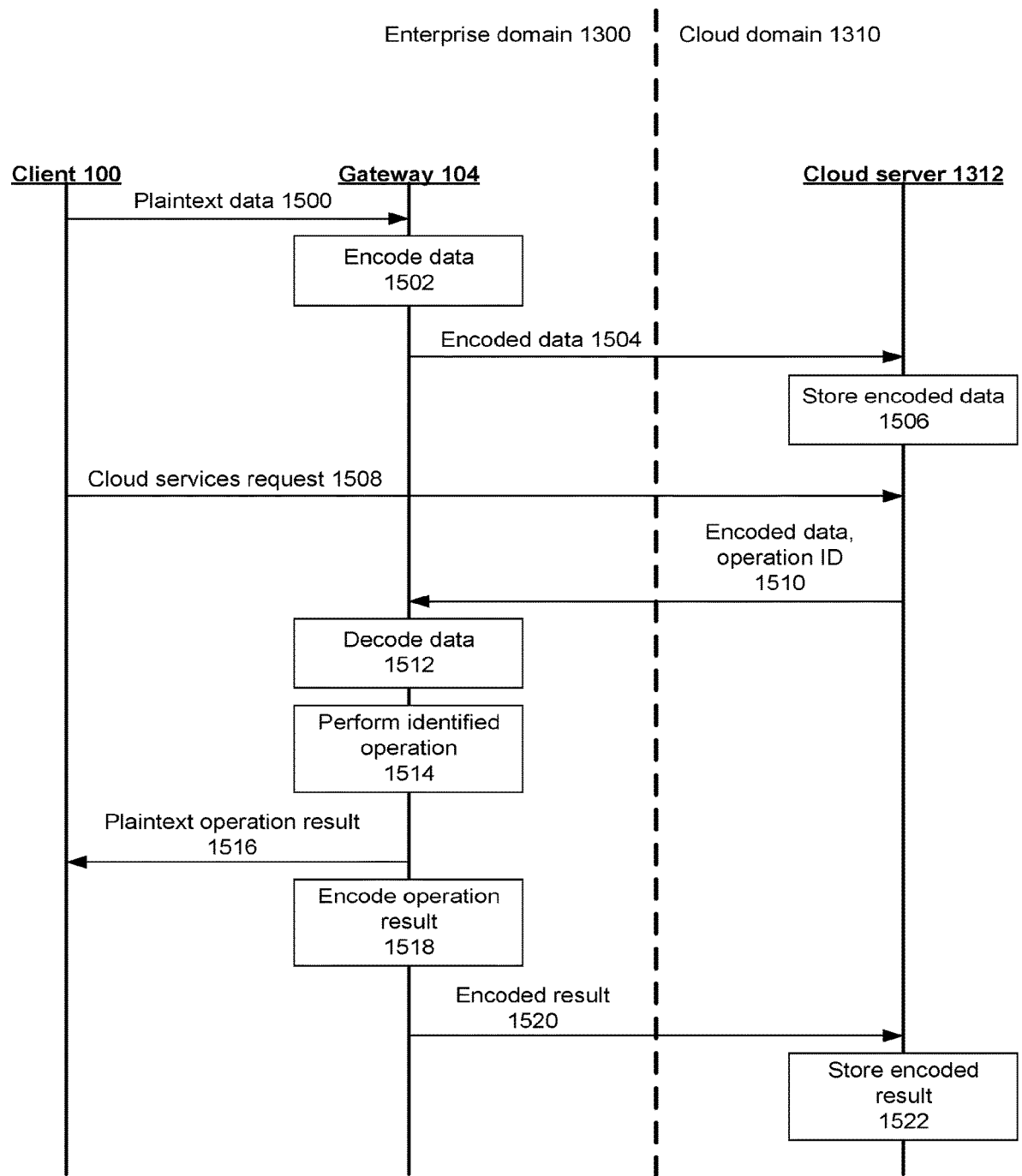
FIG. 15 illustrates a method of performing cloud service operations using a security gateway system in a multi-domain cloud environment, according to one embodiment.

FIG. 15 illustrates a method of performing cloud service operations using a security gateway system in a multi-domain cloud environment, according to one embodiment. In the embodiment of FIG. 15, communications between a client 100 and a cloud server 1312 can be routed through a gateway 104 within the enterprise domain 1300. As described above, the gateway 104 can encode data from the client 100 to the cloud server 1312, and can decode encoded data received from the cloud server 1312 and provide the decoded data to the client 100. In such embodiments, the gateway 104 acts as an intermediary system to ensure that sensitive plaintext data from the client 100 is not inadvertently sent to the cloud server 1312 without first being encoded. In these embodiments, an enterprise domain 1300 can beneficially be retrofitted to include a gateway 104 configured to identify and encode sensitive data from the client 100 without requiring an explicit request to encode the data from the client, and without requiring the client to specifically be re-configured to make such encoding requests.

The client 100 outputs 1500 plaintext data for storage at the cloud server 1312. The gateway 104 intercepts the plaintext data and encodes 1502 the data. The gateway 104 then forwards 1504 the encoded data to the cloud server 1312, which stores 1506 the encoded data, for instance in associated with an account of the client 100 or a user of the client.

The client 100 subsequently requests 1508 one or more cloud services provided by the cloud server 1312. The cloud server 1312 identifies encoded data and an operation based on the received request for cloud services, and provides 1510 the encoded data and the identified operation to the client 100. The gateway 104 intercepts the encoded data and operation and decodes 1512 the data. In the embodiment of FIG. 15, the gateway 104 performs 1514 the identified operation on the decoded data, though in other embodiments, the client 100 or a different entity within the enterprise domain 1300 performs the operation. It should be noted that in some embodiments, after decoding the received data, the gateway 104 forwards the decoded data and the provided operation to the client 100 for performance of the provided operation on the decoded data.

In the embodiment of FIG. 15, the gateway 104 provides 1516 the operation result to the client 100 in a plaintext format, encodes 1518 the operation result, and provides 1520 the encoded result to the cloud server 1312 where it is stored 1522. In other embodiments, the gateway 104 encodes and provides the operation result to the cloud server 1312 for storage without directly providing the result to the client 100. In such embodiments, the client 100 can request the operation result from the cloud server 1312, the cloud server 1312 can provide the encoded result, and the encoded result is intercepted by the gateway 104 where it is decoded and provided to the client. The client 100 can incorporate the operation result into, for instance, an interface or application corresponding to the requested cloud service.

Figure 16:
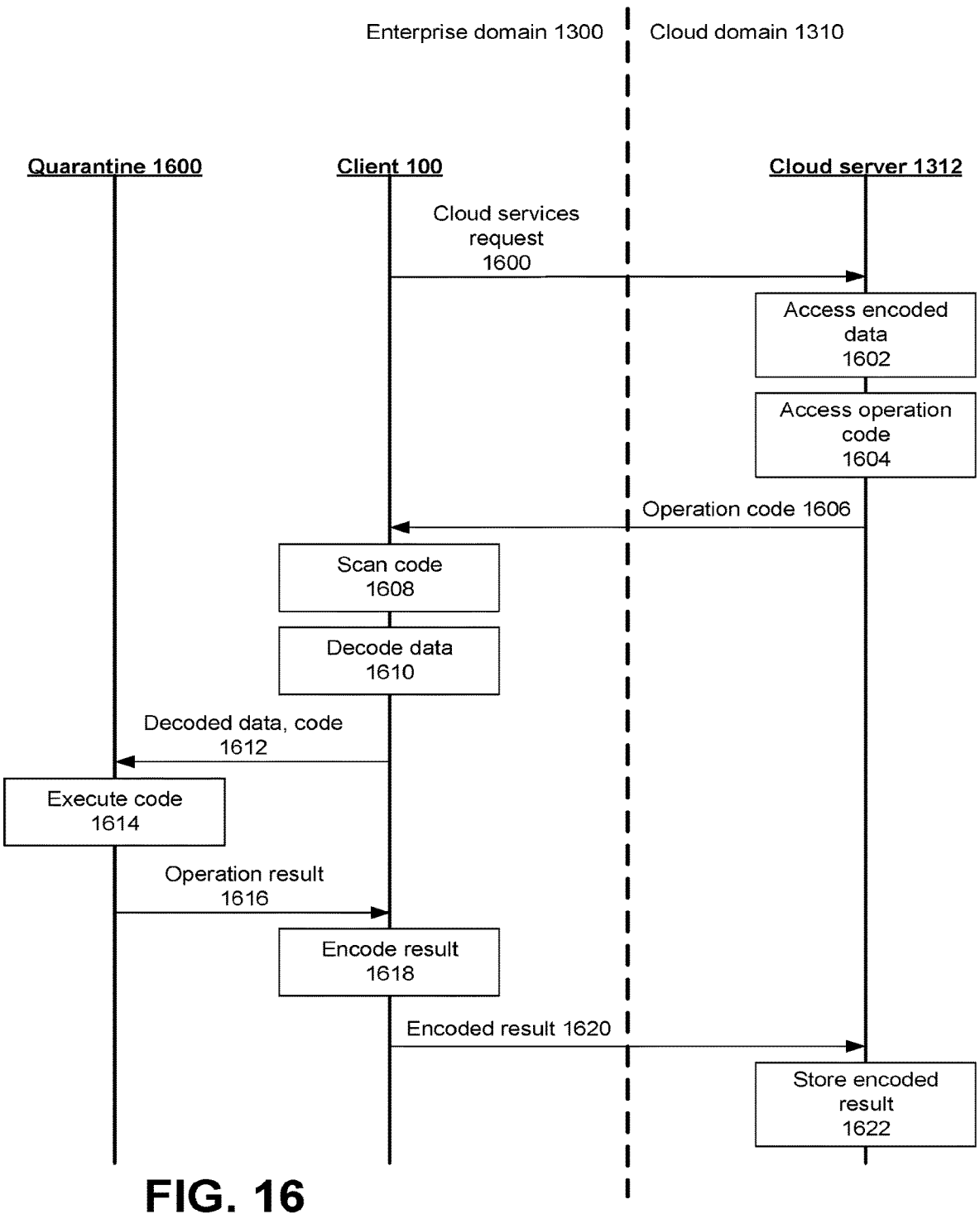
FIG. 16 illustrates a method of performing cloud service operations using a quarantine system in a multi-domain cloud environment, according to one embodiment.

FIG. 16 illustrates a method of performing cloud service operations using a quarantine system in a multi-domain cloud environment, according to one embodiment. In the embodiment of FIG. 16, the client 100 requests 1600 one or more cloud services from the cloud server 1312, which accesses 1602 encoded data and identifies operations to be performed on the accessed data based on the received request. The cloud server 1312 can query a mapping of operations available to the client 100, and can determine that the client does not have access to the operations identified based on the requested cloud services. In response, the cloud server 1312 can access 1604 source code corresponding to the identified operation, and can provide 1606 the code to the client 100 in conjunction with the accessed encoded data.

In the embodiment of FIG. 16, the client 100 scans 1608 the received code and decodes 1610 the encoded result, though it should be noted that in other embodiments, another entity within the enterprise domain 1300 can scan the code and can decode the received data. In response to a determination that the received operation code does not pose an above-threshold risk, the decoded data and operation code can be provided 1612 to a quarantine environment 1600 within the enterprise domain. The quarantine environment 1600 can be implemented within a security system such that the resources and external access available to code executed within the quarantine environment is limited. The code is executed 1614 within the quarantine environment 1600, and the operation result is provided 1616 to the client 100. The client can incorporate the result into, for instance, an interface or application corresponding to the requested cloud services, can encode 1618 the result, and can provide 1620 the encoded result to the cloud server 1312, where it is stored 1622.

In the embodiment of FIG. 16, the client 100 can include an RPC function g(p( ), X1, X2, . . . , Xn) that can receive from the cloud server 1312 operations (such as the operation P0)) in the form of operation code, objects, scripts, and the like as arguments. The cloud server can provide arguments to the operation p( ), such as X1, X2, . . . , Xn, at least some of which include protected data. The client 100 can, in response to receiving the operation P0 and the arguments X1, X2, . . . Xn via the RPC function g( ), decode the protected portions of the arguments X1, X2, . . . , Xn into plaintext and perform the operation P0 using the plaintext arguments. In such embodiments, the operation result and be re-encoded and provided to the cloud server 1312, for instance via the function g( ).

It should be noted that in the embodiments of FIGS. 14-16, the cloud server 1312 is configured to store an encoded operation result. In such embodiments, the cloud server 1312 can provide a confirmation that the encoded operation result was successfully received and stored. In other embodiments, the cloud server 1312 is not provided the encoded operation result. For example, in the embodiments of FIGS. 14 and 16, the client 100, after incorporating the operation result into the cloud services provided by the cloud server 1312, can store the operation result at the client without providing the operation result to the cloud server. Similarly, in the embodiment of FIG. 15, the gateway 104 can provide the operation result to the client 100 without providing the operation result to the cloud server 1312.

Figure 17:
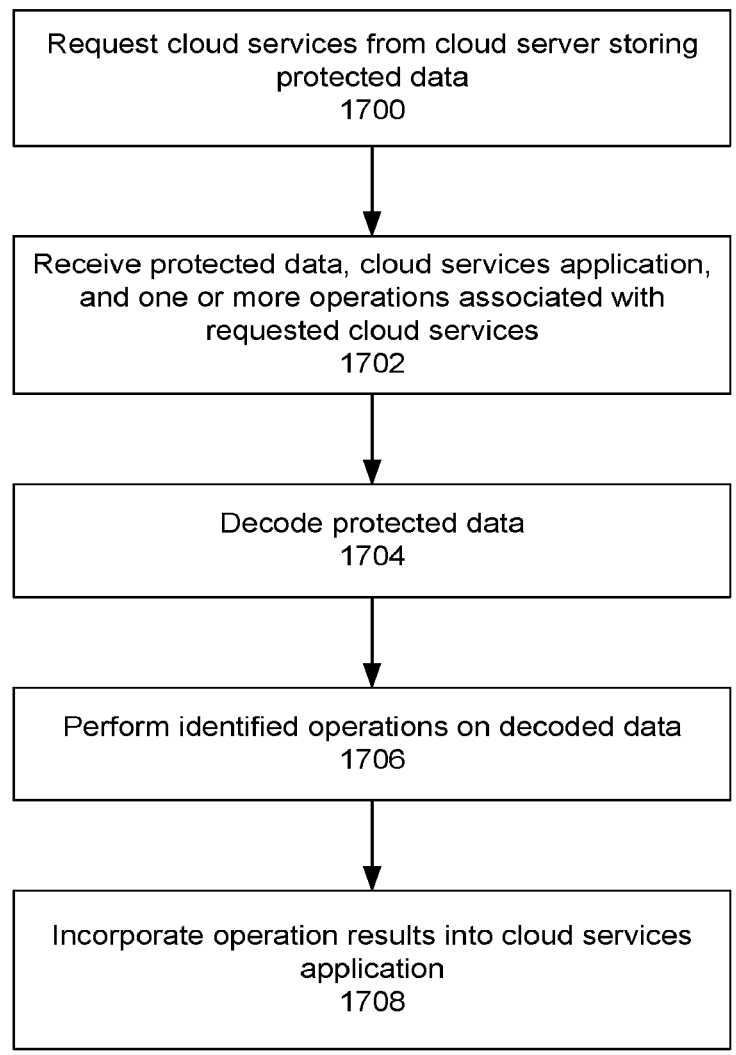
FIG. 17 illustrates a method of implementing cloud services in a multi-domain environment, according to one embodiment.

FIG. 17 illustrates a method of implementing cloud services in a multi-domain environment, according to one embodiment. Cloud services are requested 1700 by a client device from a cloud server storing protected data. Protected data, a cloud services application, and one or more operations associated with the requested cloud services are received 1702 in response to the request. The client device decodes 1704 the protected data and performs 1706 the identified operations on the decoded data. The operation results are then incorporated 1708 into the cloud services application.

It should be noted that although the term "cloud service" is used herein, in practice, a service provided by any entity external to a trust domain (even entities located within a same network) can be requested, and operations can be provided by that entity for performance by the trust domain entity. It should also be noted that by allowing an entity within a trusted domain to perform operations on protected data required by services provided by an entity external to the trusted domain, the functionality of cloud computing (SaaS) applications with access to protected data is preserved while maintaining the security of the protected data.

Additional Considerations

As mentioned above, the performance of cloud operations by a trusted entity system beneficially improve the security of data while enabling the functionality provided by cloud services by preventing an associated cloud entity from having access to the data in an unprotected form. Further, by performing cloud operations locally, the speed and efficiency of implementing the corresponding cloud services increases by reducing the amount of data transport required between the local entity and corresponding cloud servers (and the associated transportation time lag). In addition, the performance of cloud operations by a local trusted entity can be performed simultaneously with the execution of a cloud service application or process by the local trusted entity, thereby improving the performance of the local trusted entity in implementing the cloud service, and simplifying the implementation of a cloud operation result computed by the local trusted entity by eliminating potential performance lag by the cloud server.

It should be noted that the components, modules, and entities described herein are one means for implementing the functionality described herein, and in other embodiments, other suitable components, modules, and entities can implement the functionality described herein. It should also be noted that the components, modules, and entities described herein are not native components of a generic computer system or operating system, but are special purpose components, modules, and entities specially configured to implement the functionalities described herein. It should be emphasized that the functionality of these components, modules, and entities extends the functionality of the underlying services described herein beyond their generic functions.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a non-transitory computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A gateway device coupled between a client device and a server, the gateway device comprising:
   an input configured to intercept encoded data and a set of operation identifiers identifying a first set of operations sent by the server to the client device in response to a request by the client device for cloud services associated with a cloud computation operation, the client device configured to execute an application or interface provided by the server, the server is configured to query the client device or the gateway device to identify available operations before sending the set of operation identifiers;
   a hardware processor configured to:
      identify a second set of operations based on the first set of operations, wherein the gateway device is unable to perform one or more of the first set of operations and is able to perform each of the second set of operations, and wherein the second set of operations, when performed, produce a computational result similar to the first set of operations, when performed;

perform the second set of operations using the encoded data to produce result data; and provide the result data to the client device, the client device configured to incorporate the result data into the executed application or interface.

2. The gateway device of claim 1, wherein the gateway device is configured to intercept the encoded data and the set of operation identifiers before the client device receives the encoded data and the set of operation identifiers.

3. The gateway device of claim 1, wherein the hardware processor is configured to decode the encoded data to produce decoded data, and to perform the second set of operations on the decoded data to produce the result data.

4. The gateway device of claim 1, wherein the cloud computation operation comprises a set of computational operations different than the first set of operations and the second set of operations.

5. The gateway device of claim 1, wherein the server is configured to provide executable code to the gateway device, and wherein the gateway device is configured to execute the code.

6. A method comprising:
intercepting, by a gateway device coupled between a server and a client device, encoded data and a set of operation identifiers identifying a first set of operations sent by the server to the client device in response to a request by the client device for cloud services associated with a cloud computation operation, the client device configured to execute an application or interface provided by the server, the server is configured to query the client device or the gateway device to identify available operations before sending the set of operation identifiers;

identifying, by the gateway device, a second set of operations based on the first set of operations, wherein the gateway device is unable to perform one or more of the first set of operations and is able to perform each of the second set of operations, and wherein the second set of operations, when performed, produce a computational result similar to the first set of operations, when performed;

performing, by the gateway device, the second set of operations using the encoded data to produce result data; and providing, by the gateway device, the result data to the client device, the client device configured to incorporate the result data into the executed application or interface.

7. The method of claim 6, wherein the gateway device is configured to intercept the encoded data and the set of operation identifiers before the client device receives the encoded data and the set of operation identifiers.

8. The method of claim 6, wherein the gateway device is configured to decode the encoded data to produce decoded data, and to perform the second set of operations on the decoded data to produce the result data.

9. The method of claim 6, wherein the cloud computation operation comprises a set of computational operations different than the first set of operations and the second set of operations.

10. The method of claim 6, wherein the server is configured to provide executable code to the gateway device, and wherein the gateway device is configured to execute the code.

11. A non-transitory computer-readable storage medium storing executable computer instructions that, when executed by a processor of a gateway device coupled between a server and a client device, cause the processor to perform steps comprising:
intercepting, by the gateway device, encoded data and a set of operation identifiers identifying a first set of operations sent by the server to the client device in response to a request by the client device for cloud services associated with a cloud computation operation, the client device configured to execute an application or interface provided by the server, the server is configured to query the client device or the gateway device to identify available operations before sending the set of operation identifiers;

identifying, by the gateway device, a second set of operations based on the first set of operations, wherein the gateway device is unable to perform one or more of the first set of operations and is able to perform each of the second set of operations, and wherein the second set of operations, when performed, produce a computational result similar to the first set of operations, when performed;

performing, by the gateway device, the second set of operations using the encoded data to produce result data; and providing, by the gateway device, the result data to the client device, the client device configured to incorporate the result data into the executed application or interface.

12. The non-transitory computer-readable storage medium of claim 11, wherein the gateway device is configured to intercept the encoded data and the set of operation identifiers before the client device receives the encoded data and the set of operation identifiers.

13. The non-transitory computer-readable storage medium of claim 11, wherein the gateway device is configured to decode the encoded data to produce decoded data, and to perform the second set of operations on the decoded data to produce the result data.

14. The non-transitory computer-readable storage medium of claim 11, wherein the cloud computation operation comprises a set of computational operations different than the first set of operations and the second set of operations.

* * * * *